(12) United States Patent
Kurata et al.

(10) Patent No.: US 11,754,915 B2
(45) Date of Patent: Sep. 12, 2023

(54) LIGHT SOURCE APPARATUS AND IMAGE PROJECTION APPARATUS

(71) Applicant: CANON KABUSHIKI KAISHA, Tokyo (JP)

(72) Inventors: Yuya Kurata, Tochigi (JP); Hiroshi Yamamoto, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 7 days.

(21) Appl. No.: 17/487,101

(22) Filed: Sep. 28, 2021

(65) Prior Publication Data

US 2022/0011659 A1    Jan. 13, 2022

Related U.S. Application Data

(63) Continuation of application No. PCT/JP2020/015056, filed on Apr. 1, 2020.

(30) Foreign Application Priority Data

Apr. 9, 2019 (JP) .................... 2019-073995

(51) Int. Cl.
*G03B 21/20* (2006.01)
*G03B 33/12* (2006.01)

(52) U.S. Cl.
CPC ....... *G03B 21/2073* (2013.01); *G03B 21/204* (2013.01); *G03B 21/2013* (2013.01); *G03B 21/2053* (2013.01); *G03B 33/12* (2013.01)

(58) Field of Classification Search
CPC ............ G03B 21/2073; G03B 21/2013; G03B 21/204; G03B 21/2053; G03B 33/12
(Continued)

(56) References Cited

U.S. PATENT DOCUMENTS 9,310,033 B2    4/2016    Yamada
10,175,566 B2    1/2019    Matsubara
(Continued)

FOREIGN PATENT DOCUMENTS

CN    101923222 A  * 12/2010
JP    2006064906 A  *  3/2006
(Continued)

OTHER PUBLICATIONS

Translation of JP2006064906 (Year: 2022).*
(Continued)

*Primary Examiner* — Jerry L Brooks
(74) *Attorney, Agent, or Firm* — ROSSI, KIMMS & McDOWELL LLP

(57) ABSTRACT

A light source apparatus includes light sources emitting first and second polarized light, an optical element transmitting one of the polarized light and reflecting the other, a polarization rotator generating polarization rotated light from the first polarized light, a wavelength convertor converting the second polarized light into wavelength converted light, and a controller. The optical element generates emitted light by combining the wavelength converted light and polarization rotated light. The controller acquires respective deterioration amounts of the light sources, and controls, based on respective changes in light emission amounts from the light sources acquired from the deterioration amounts, the light emission amount from at least one of the light sources for making different respective change amounts of the light emission amounts from the light sources, or changing a ratio between respective light emission amounts from the light sources.

15 Claims, 24 Drawing Sheets

(58) Field of Classification Search
USPC .......................................................... 353/20
See application file for complete search history.

(56) References Cited

U.S. PATENT DOCUMENTS

| | | |
|---|---|---|
| 2014/0140038 A1 | 5/2014 | Gerets |
| 2019/0064645 A1* | 2/2019 | Akiyama ............. G02B 5/0205 |

FOREIGN PATENT DOCUMENTS

| | | | |
|---|---|---|---|
| JP | 2016186566 A | * | 10/2016 |
| JP | 2016186566 A | | 10/2016 |
| JP | 2016186892 A | | 10/2016 |
| JP | 2016218303 A | | 12/2016 |
| JP | 2017040676 A | | 2/2017 |
| WO | 2013105546 A1 | | 7/2013 |
| WO | 2019107261 A1 | | 6/2019 |
| WO | WO-2019174157 A1 * | 9/2019 | ......... G02B 27/1006 |

OTHER PUBLICATIONS

Translation of WO2019174157 (Year: 2022).*
Translation of CN101923222 (Year: 2022).*
Translation of JP2016186566 (Year: 2022).*
International search report issued in Intl. Appln. No. PCT/JP2020/015056 dated Jun. 9, 2020. English translation provided.
Written Opinion issued in Intl. Appln. No. PCT/JP2020/015056 dated Jun. 9, 2020.
English translation of Written Opinion issued in Intl. Appln. No. PCT/JP2020/015056 dated Jun. 9, 2020, previously cited in IDS filed Sep. 28, 2021.
International Preliminary Report on Patentability issued in Intl. Appln. No. PCT/JP2020/015056 dated Oct. 21, 2021.

* cited by examiner

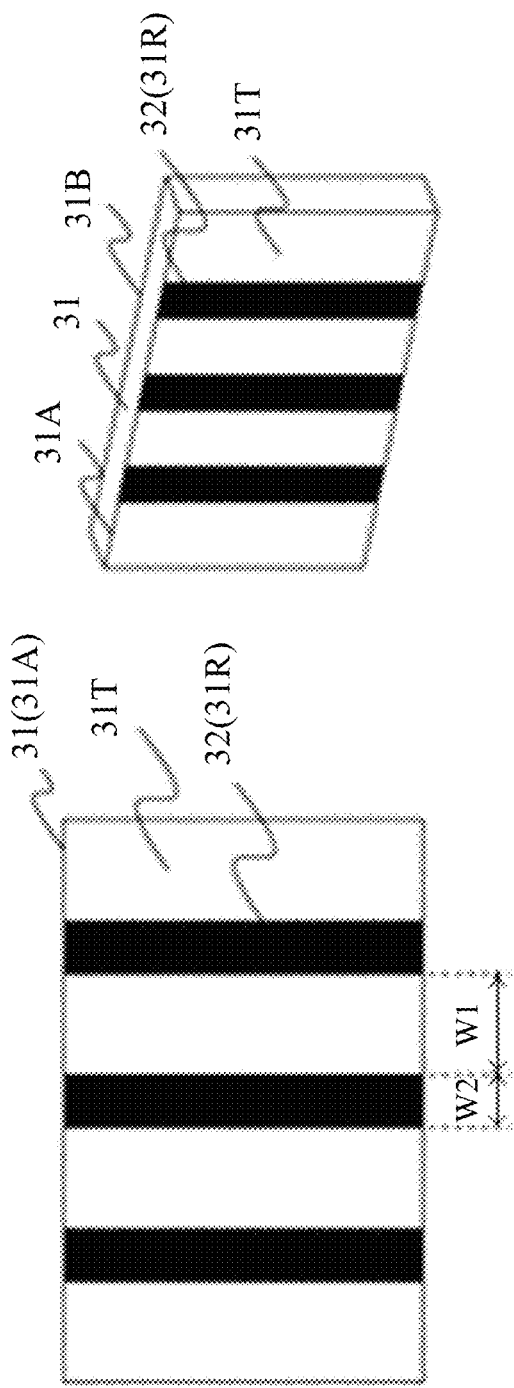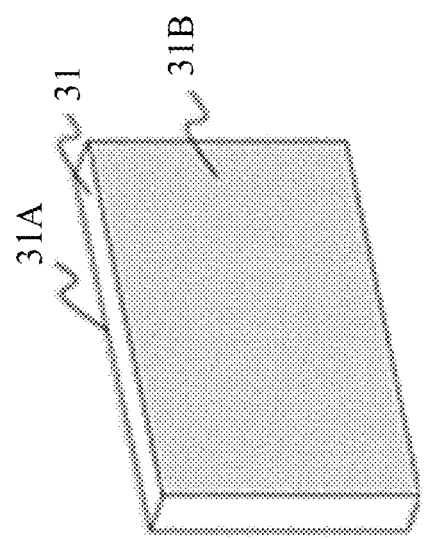
FIG. 3A
FIG. 3B
FIG. 3C

LIGHT SOURCE APPARATUS AND IMAGE PROJECTION APPARATUS

CROSS-REFERENCE TO RELATED APPLICATIONS

This application is a Continuation of International Patent Application No. PCT/JP2020/015056, filed on Apr. 1, 2020, which claims the benefit of Japanese Patent Application No. 2019-073995, filed on Apr. 9, 2019, which is hereby incorporated by reference herein in their entirety.

BACKGROUND OF THE INVENTION

Field of the Invention

The present invention relates to a light source apparatus suitable for an image projection apparatus (projector) or the like.

Description of the Related Art

Japanese Patent Application Laid-Open No. ("JP") 2016-186892 discloses a projector that projects and displays a color image using a blue laser diode (LD) configured to emit blue light and a fluorescent body (hereinafter referred to as a yellow fluorescent body) configured to convert part of the blue light from the blue LD into yellow light (green light+ red light) as fluorescent light. This projector uses a light source apparatus which combines blue light from two blue LD arrays in a light combiner having alternately arranged transmissive areas and reflective areas, and guides part of the combined blue light to the fluorescent body.

The yellow fluorescent body emits green light and red light, but a light amount of the red light is likely to be insufficient for a light amount of the green light. Hence, with the projector in JP 2016-186892, in which red light used for image projection consists only of the red light emitted from the yellow fluorescent body, it is difficult to display a reddish projected image with sufficient luminance.

Further, regarding the blue light from the blue LD, a blue wavelength having a high fluorescence conversion efficiency in the yellow fluorescent body is different from a blue wavelength capable of improving a blue hue in the projected image, and hence it is difficult to improve both the luminance and hue of the projected image.

SUMMARY OF THE INVENTION

The present invention provides a light source apparatus which can improve a hue and luminance of light from a light source, and can reduce a change in the hue when the luminance changes, and an image projection apparatus having the same.

A light source apparatus according to one aspect of the present invention includes a first light source configured to emit first polarized light, a second light source configured to emit second polarized light whose polarization direction is different from a polarization direction of the first polarized light, an optical element configured to transmit one polarized light of the first and second polarized light and to reflect the other polarized light, a polarization rotator configured to generate polarization rotated light by rotating the polarization direction of the first polarized light from the optical element, a wavelength convertor configured to convert the second polarized light from the optical element into wavelength converted light whose wavelength is different from a wavelength of the second polarized light, and a controller. The optical element generates emitted light by combining the wavelength converted light and the polarization rotated light. The controller is configured to acquire respective deterioration amounts of the first and second light sources, and control, based on respective changes in light emission amounts from the first and second light sources, wherein the changes are acquired from the deterioration amounts, the light emission amount from at least one light source of the first and second light sources so as to make different a change amount of the light emission amount from the first light source and a change amount of the light emission amount from the second light source, or so as to change a ratio between the light emission amount from the first light source and the light emission amount from the second light source. An image projection apparatus including the above light source apparatus also constitute another aspect of the present invention.

A control method for the above light source apparatus according to one aspect of the present invention includes acquiring respective deterioration amounts of the first and second light sources and acquiring, from the deterioration amounts, changes in light emission amounts from the first and second light sources, and controlling, based on the changes, the light emission amount from at least one light source of the first and second light sources so as to make different a change amount of the light emission amount from the first light source and a change amount of the light emission amount from the second light source, or so as to change a ratio between the light emission amount from the first light source and the light emission amount from the second light source. Further, a non-transitory computer-readable storage medium storing a computer program that causes a computer of the above light source apparatus to execute processing of the above controlling method also constitute another aspect of the present invention.

Further features of the present invention will become apparent from the following description of exemplary embodiments with reference to the attached drawings.

BRIEF DESCRIPTION OF THE DRAWINGS

FIGS. 3A to 3C are diagrams illustrating a configuration of a light combiner included in a light source apparatus according to the first to fourth embodiments.

DESCRIPTION OF THE EMBODIMENTS

Hereinafter, embodiments of the present invention will be described with reference to the drawings.

Figure 1:
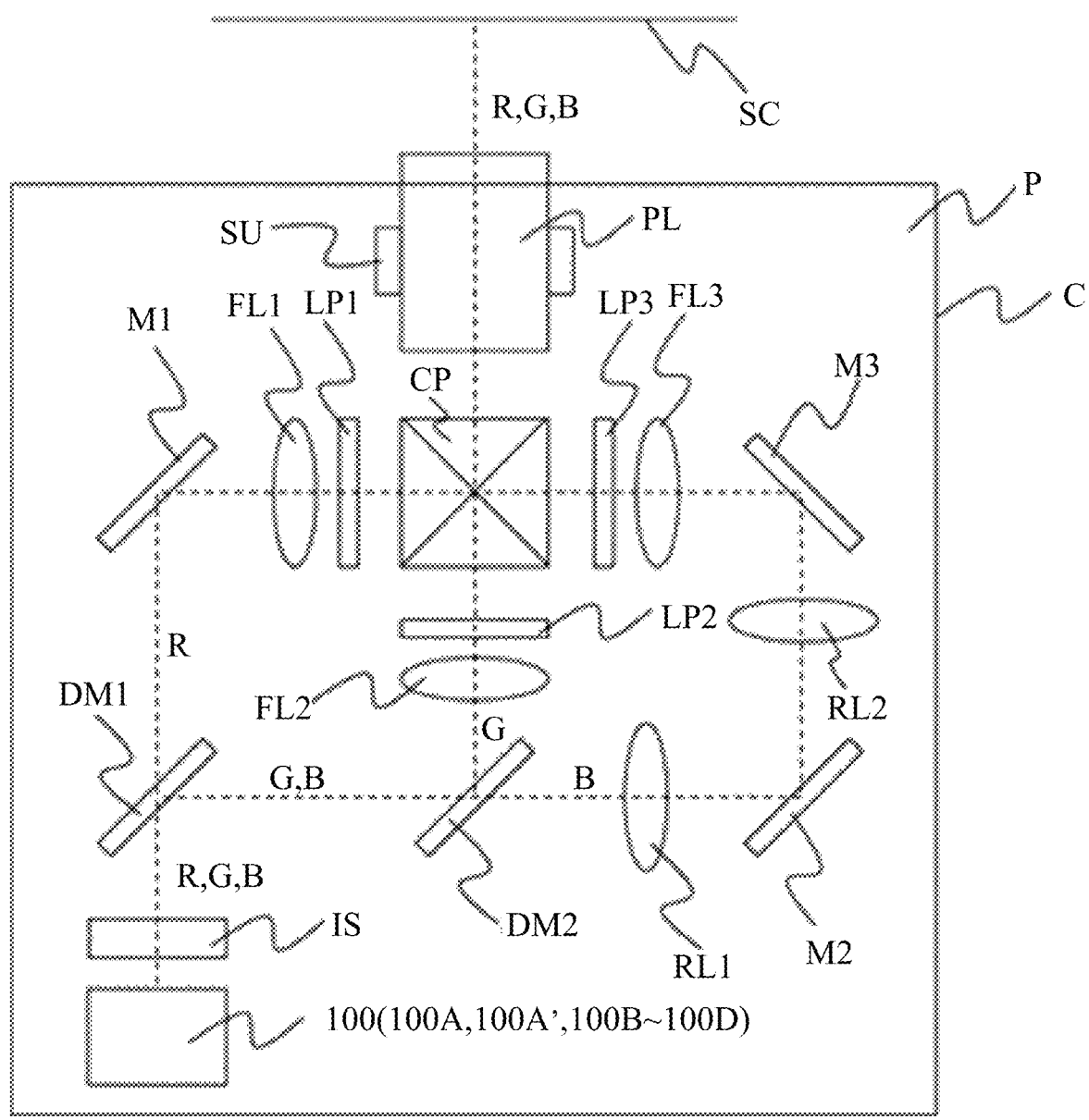
FIG. 1 is a diagram illustrating a configuration of a projector in which a light source apparatus can be installed according to first to fifth embodiments of the present invention.

FIG. 1 illustrates a configuration of a projector P as an image projection apparatus in which any of the light source apparatuses 100 (100A, 100A', 100B, 100C, and 100D) according to first to fifth embodiments described later can be installed. The projector P includes a light source apparatus 100, a light modulator configured to modulate light from the light source apparatus 100, and a lens holder SU configured to hold a projection lens (projection optical system) PL. The projection lens (projection optical system) PL is configured to project image light, which is light from the light modulator, onto a screen (projection surface) SC.

The light modulator is an inclusive term for a light modulator LP1 for red light, a light modulator LP2 for green light, and a light modulator LP3 for blue light, which will be described later. In FIG. 1, all of the light modulators LP1 to LP3 use a transmission type liquid crystal panel as a light modulation element.

The lens holder SU may detachably hold the projection lens PL or the projection lens PL may be configured so that the projection lens PL cannot be detached from the lens holder SU. The holder SU may also have a function of shifting the held projection lens PL in a direction orthogonal to its optical axis.

The projector P further includes an illumination optical system IS and a color separating/combining system. The color separating/combining system is an inclusive term for dichroic mirrors DM1 and DM2, mirrors M1, M2, and M3, field lenses FL1, FL2, and FL3, and relay lenses RL1 and RL2, which will be described later.

Red light R, green light G and blue light B as light emitted from the light source apparatus 100 in each embodiment enter the dichroic mirror 1 via the illumination optical system IS. The dichroic mirror DM1 has a characteristic of transmitting red light R and reflecting green light G and blue light B. The illumination optical system IS includes a fly-eye lens configured to split light from the light sources into a plurality of light beams, and a polarization converter configured to convert entering nonpolarized light into linearly polarized light having a specific polarization direction and to generate illumination light that irradiates the light modulator with a uniform illumination distribution.

The red light R transmitted through the dichroic mirror DM1 enters the light modulator LP1 for red light via the mirror M1 and the field lens FL1. The light modulator LP1 for red light is driven based on an image signal input from an external device to the projector to modulate the red light R. The modulated red light R enters the combining prism CP.

The green light G reflected by the dichroic mirror DM1 enters the dichroic mirror DM2. The dichroic mirror DM2 has a characteristic of reflecting green light G and transmitting blue light B. The green light G reflected by the dichroic mirror DM2 enters the light modulator LP2 for green light via the field lens FL2. The light modulator LP2 for green light is driven based on the above image signal to modulate the green light G. The modulated green light G enters the combining prism CP.

The blue light B transmitted through the dichroic mirror DM1 passes through the dichroic mirror DM2. The blue light B transmitted through the dichroic mirror DM2 enters the light modulator LP3 for blue light via the relay lens RL1, the mirror M2, the relay lens RL2, the mirror M3, and the field lens FL3. The light modulator LP3 for blue light is driven based on the above image signal to modulate the blue light B. The modulated blue light B enters the combining prism CP.

The combining prism CP combines the red light R, the green light G, and the blue light B entering the combining prism CP, and generates image light. The projection lens PL magnifies and projects the image light onto the screen SC. Thereby, a projected image is displayed.

First Embodiment

Figure 2:
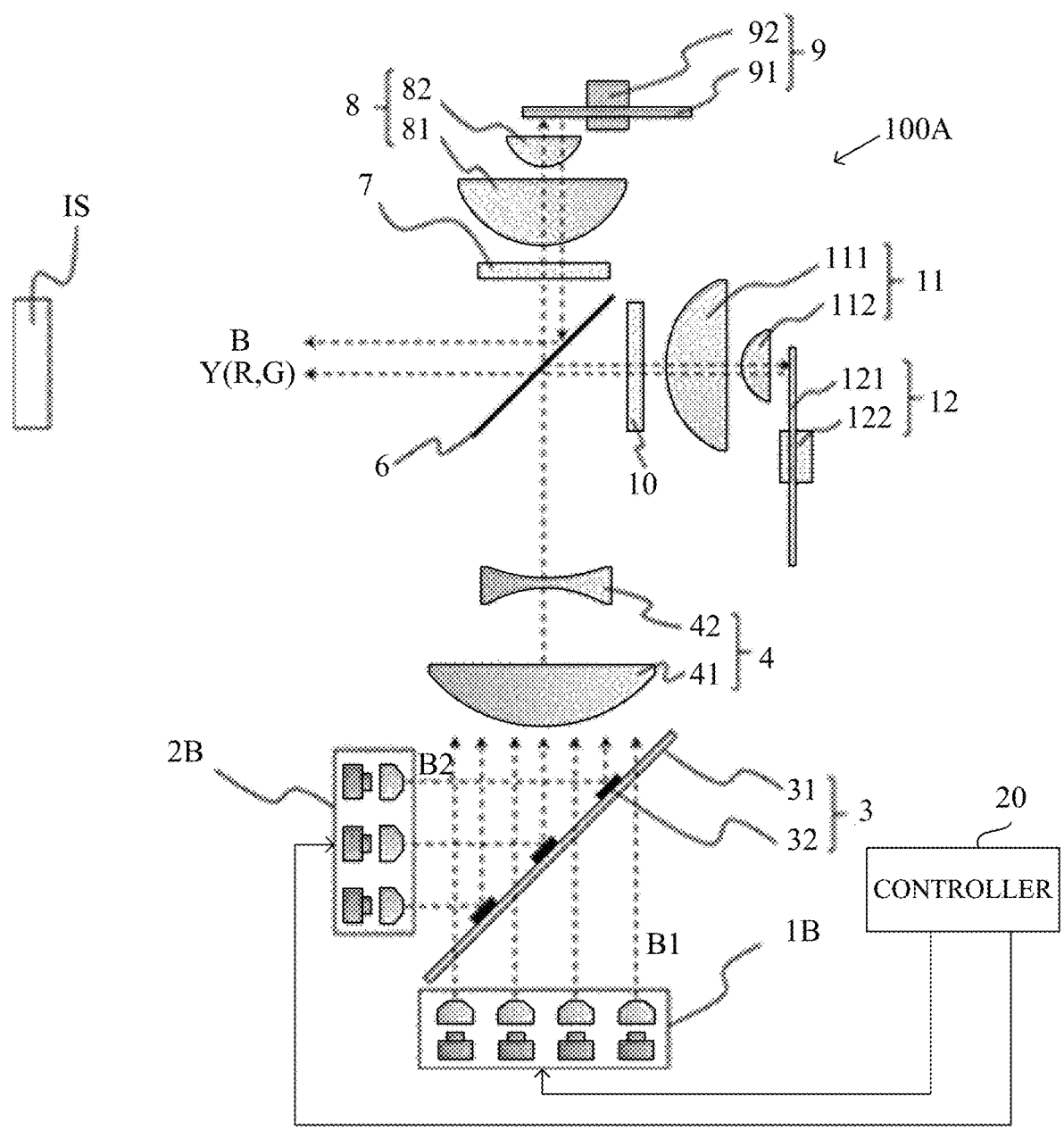
FIG. 2 is a diagram illustrating a configuration of a light source apparatus according to the first and second embodiments.

FIG. 2 illustrates a configuration of a light source apparatus 100A according to the first embodiment. The light source apparatus 100A includes a blue laser diode (LD)

array 1B as a first light source configured to emit blue light B1 (wavelength 455 nm) as first wavelength light and first polarized light, and a blue LD array 2B as a second light source configured to emit blue light B2 (wavelength 455 nm) as second wavelength light and second polarized light. The blue light B2 has the same wavelength and a polarization direction different by 90 degrees, with respect to the blue light B1. The blue LD arrays 1B and 2B includes a plurality of GaN semiconductor LDs. However, this is merely an example, and other semiconductor LDs may be used.

In this embodiment and the other embodiments described later, blue light is light having a spectral distribution in which a wavelength with maximum intensity or full width at half maximum is included in a band of 430 to 480 nm. Further, green light is light having a spectral distribution in which a wavelength with maximum intensity or full width at half maximum is included in a band of 500 to 580 nm.

The light source apparatus 100A further includes a light combiner (light combining element) 3 having a transmissive area for transmitting the blue light B1 and a reflective area for reflecting the blue light B2. As illustrated in FIGS. 3A and 3B, the light combiner 3 has a configuration in which an aluminum reflective film 32 as a reflective portion is provided in a reflective area 31R, which is a plurality of partial areas, on a surface 31A closer to the blue LD array 2B (closer to the second light source) among both surfaces of a transparent substrate (transmissive substrate) 31. The transmissive area is a plurality of areas 31T in which the aluminum reflective film 32 is not provided on the transparent substrate 31. As illustrated in FIG. 3C, an antireflection film is provided on a surface 31B closer to the blue LD array 1B (closer to the first light source) among both surfaces of the transparent substrate 31. Thereby, it is possible to guide most of the blue light B1 from the blue LD array 1B to the light combiner 3.

The light combiner 3 may have a configuration in which the blue light B1 and B2 are combined by transmitting and reflecting them depending on their polarization directions.

The light source apparatus 100A further includes a positive lens 41, a negative lens 42, and a compression optical system 4 configured to narrow a width of the light from the light combiner 3. By narrowing the width of the light from the light combiner 3 by the compression optical system 4, various optical members subsequent to the compression optical system 4 can be made small, making it possible to reduce the size of the entire light source apparatus 100A.

The light source apparatus 100A further includes a polarized light splitter (optical element) 6, a λ/4 plate (first λ/4 plate as a polarization rotator) 7, a collective optical system 8 including collective lenses 81 and 82, and a diffuser unit (diffuser) 9. The diffuser unit 9 includes a diffuser wheel 91 and a motor 92 configured to rotate the diffuser unit 9. The collective optical system 8 guides the light from the λ/4 plate 7 to the diffuser wheel 91, and while letting the light from the diffuser wheel 91 enter, collimates and guides the light to the λ/4 plate 7. The diffuser wheel 91 is provided with a diffusion layer for diffusing the light from the λ/4 plate 7, the diffusion layer having a ring shape and provided on an aluminum substrate. Since the diffuser wheel 91 is rotated by the motor 92, the light from the λ/4 plate 7 does not continuously irradiate one fixed place on the diffusion layer, and therefore the deterioration of the diffusion layer is hindered.

The light source apparatus 100A further includes a λ/4 plate (second λ/4 plate) 10, a collective optical system 11 including collective lenses 111 and 112, and a fluorescent body unit (wavelength convertor) 12. The fluorescent body unit 12 includes a fluorescent body wheel 121 and a motor 122 for rotating the fluorescent body wheel 121. The collective optical system 11 guides light from the λ/4 plate 10 to the fluorescent body wheel 121, and while letting the light from the fluorescent body wheel 121 enter, collimates and guides the light to the λ/4 plate 10. The fluorescent body wheel 121 is provided with a yellow fluorescent body layer for converting a wavelength of light (excitation light) from the λ/4 plate 10, the yellow fluorescent body layer having a ring shape and provided on an aluminum substrate. Since the fluorescent body wheel 121 is rotated by the motor 122, the light from the λ/4 plate 10 does not continuously irradiate one fixed place on the yellow fluorescent body layer, and therefore the deterioration of the yellow fluorescent body layer is hindered.

The light source apparatus 100A includes a controller 20 as a control unit. The controller 20 including a computer such as a CPU executes processing for controlling driving of the blue LD array 1B and the blue LD array 2B (that is, a light emission amount) according to a computer program.

Figure 4:
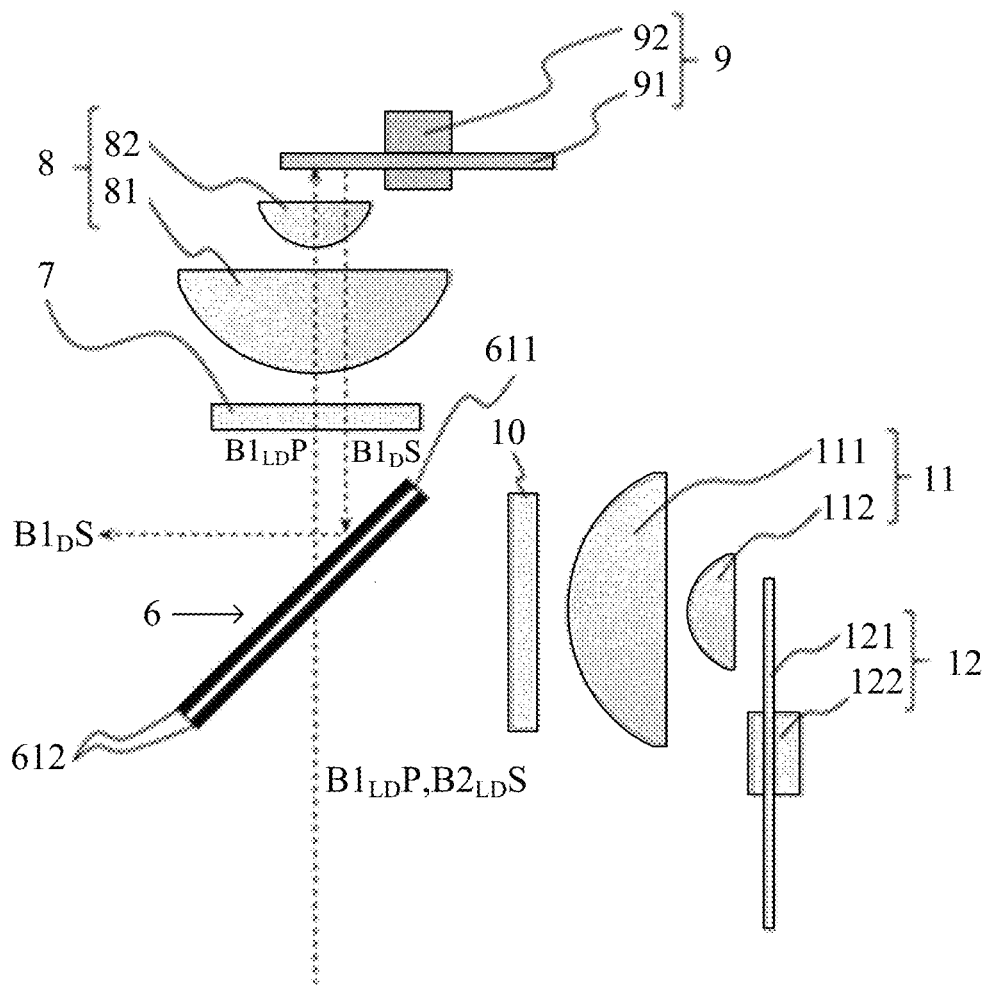
FIG. 4 is a diagram illustrating an optical path of first blue light in the light source apparatus according to the first and second embodiments.

FIG. 4 illustrates an optical path when blue light $B1_{LD}$ from the blue LD array 1B is guided to the illumination optical system IS via the diffuser unit 9. The blue light $B1_{LD}$ from the blue LD array 1B enters a polarized light splitting film 612 of the polarized light splitter 6, accompanying with blue light $B2_{LD}$ from the blue LD array 2B. In the drawing, the blue light $B1_{LD}$ is indicated as $B1_{LD}P$ because the blue light $B1_{LD}$ is P-polarized light with respect to the polarized light splitting film 612, and the blue light $B2_{LD}$ is indicated as $B2_{LD}S$ because the blue light $B2_{LD}$ is S-polarized light.

The polarized light splitting film 612 is provided on respective entire surfaces of both surfaces of the transparent substrate (transmissive substrate) 611. However, the polarized light splitting film 612 may be provided on one surface of the transparent substrate 611. This also applies to the other embodiments described later.

Figure 7:
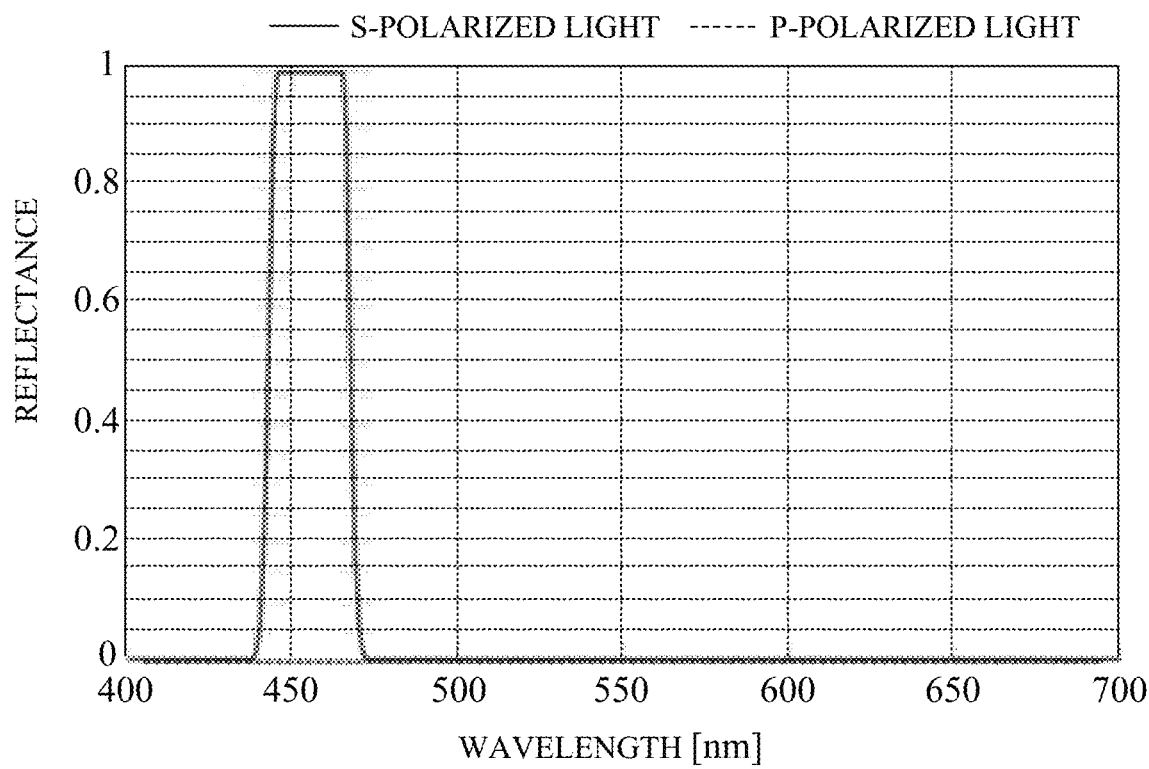
FIG. 7 is a diagram illustrating a characteristic of a polarized light splitting film according to the first and second embodiments.

FIG. 7 illustrates a characteristic of the polarized light splitting film 612. The polarized light splitting film 612 has a characteristic of performing polarization splitting for the blue light $B1_{LD}S$ from the blue LD array 1B and the blue light $B2_{LD}P$ from the blue LD array 2B, and transmitting light having other wavelengths regardless of its polarization direction.

The blue light $B1_{LD}P$ transmitted through the polarized light splitting film 612 is converted into circularly polarized light by the λ/4 plate 7, collected by the collective optical system 8 and emitted to the diffuser wheel 91. The blue light $B1_{LD}$ diffused by the diffuser wheel 91 is collimated by the collective optical system 8, converted into S-polarized light (polarization rotated light) by the λ/4 plate 7, and is emitted to the polarized light splitting film 612. The blue light $B1_{LD}S$, which is converted into S-polarized light, is reflected by the polarized light splitting film 612 and guided to the illumination optical system IS.

Figure 5:
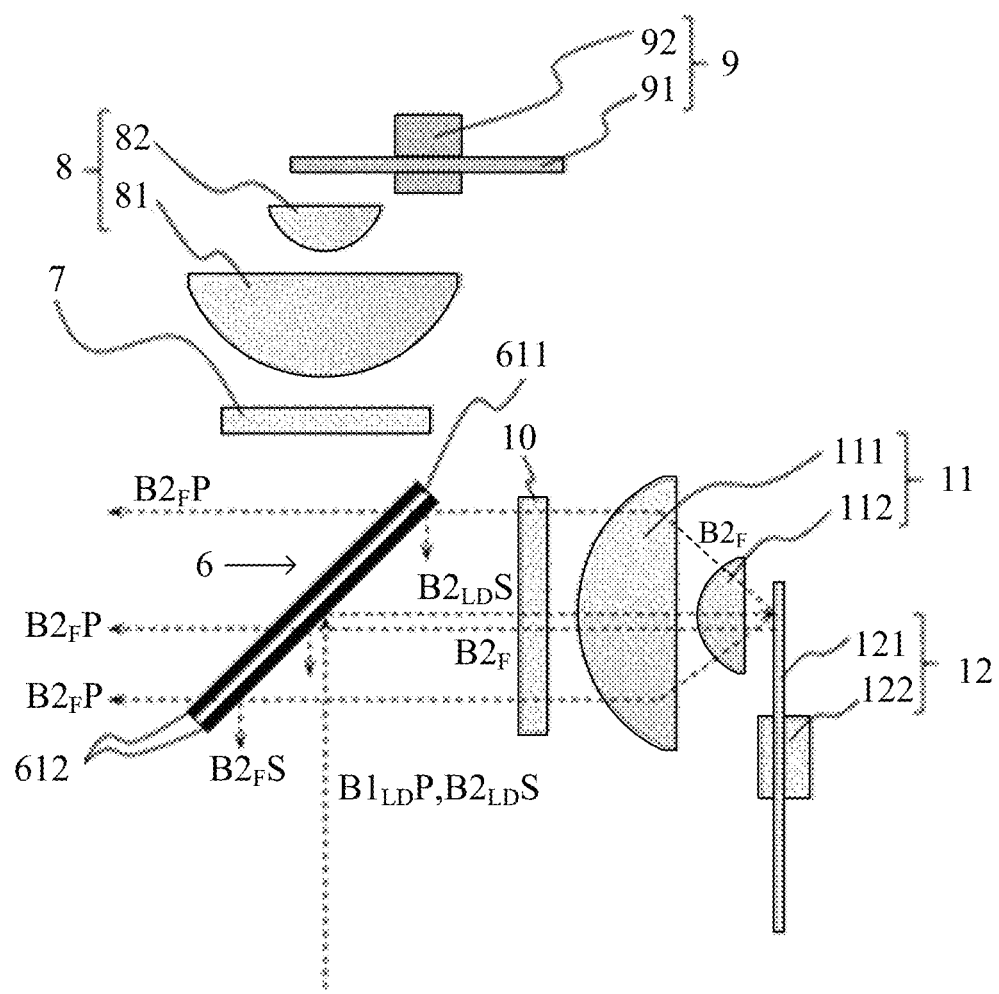
FIG. 5 is a diagram illustrating an optical path of second blue light in the light source apparatus according to the first and second embodiments.

FIG. 5 illustrates an optical path when the blue light $B2_{LD}$ from the blue LD array 2B is guided to the illumination optical system IS via the fluorescent body unit 12. As described with reference to FIG. 4, the blue light $B2_{LD}S$, which is S-polarized light, is reflected by the polarized light splitting film 612. The reflected blue light $B2_{LD}S$ is converted into circularly polarized light by the λ/4 plate 10, collected by the collective optical system 11, and emitted to the yellow fluorescent body layer on the fluorescent body wheel 121. The yellow fluorescent body layer performs wavelength conversion so as to convert part of the blue light as excitation light into yellow light (red light+green light) as fluorescent light (wavelength converted light) having wavelength longer than the wavelength of the blue light.

Blue light (hereinafter referred to as non-converted blue light) $B2_F$ as non-converted light of the blue light $B2_{LD}S$, which has not been wavelength-converted by the yellow fluorescent body layer, is collimated by the collective optical system 11, passes through the λ/4 plate 10, and enters the polarized light splitting film 612. Polarization directions of the non-converted blue light $B2_F$ entering the polarized light splitting film 612 are not aligned, and an S-polarized light component $B2_FS$ of the non-converted blue light $B2_F$ is reflected by the polarized light splitting film 612 and returned to the blue LD array 2B. A P-polarized light component $B2_FP$ passes through the polarized light splitting film 612 and is guided to the illumination optical system IS.

Figure 6:
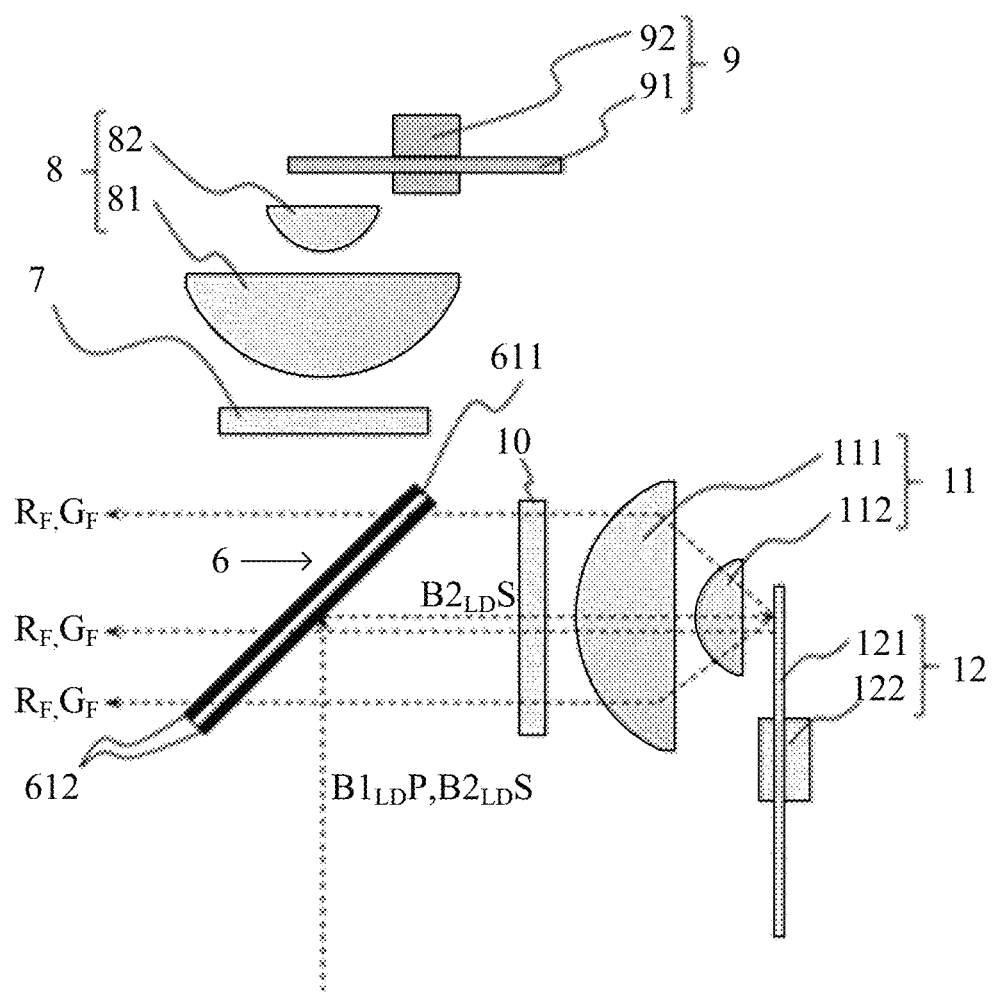
FIG. 6 is a diagram illustrating an optical path of fluorescent light in the light source apparatus according to the first and second embodiments.

FIG. 6 illustrates an optical path when fluorescent light ($R_F$, $G_F$) from the fluorescent body unit 12 is guided to the illumination optical system IS. As described above, green fluorescent light $G_F$ and red fluorescent light $R_F$ are emitted from the yellow fluorescent body layer on the fluorescent body wheel 121. The fluorescent light ($R_F$, $G_F$) entering the polarized light splitting film 612 having the above-described characteristic is guided to the illumination optical system IS through the polarized light splitting film 612 regardless of a polarization direction of the fluorescent light.

As described above, the light source apparatus 100A illustrated in FIG. 2 combines yellow light Y, which includes red light R and green light G, and blue light B with the polarized light splitter 6 and emits the light to the illumination optical system IS as emitted light.

Here, a description will be given of a luminance saturation of the fluorescent body included in the yellow fluorescent body layer. There is a limit for an excitation light amount on which a fluorescent body can perform wavelength conversion (fluorescence conversion). Therefore, as the excitation light amount irradiating the fluorescent body increases, a generated fluorescent light amount draws a saturation curve, and a ratio between the excitation light amount and the fluorescent light amount relatively changes. When an explanation is given with xy chromaticity, the light from the blue LD array 1B and the blue LD array 2B has a chromaticity of (0.14, 0.04), and the fluorescent light has a chromaticity of (0.41, 0.57). As the excitation light amount from the blue LD array 2B increases, the fluorescent light amount also increases, but light that returns as the excitation light without being converted into fluorescent light gradually increases. As a result, the fluorescent light amount emitted from the fluorescent body decreases, indicating a tendency of saturation.

On the other hand, if the blue light amount from the blue LD array 1B is maintained, the blue light amount emitted from the light source apparatus 100A is maintained. Hence, when the excitation light amount from the blue LD array 2B increases and the fluorescent light amount increases, a chromaticity of the light emitted from the light source apparatus 100A changes from the chromaticity of the fluorescent light so as to approach the chromaticity of the excitation light via a line connecting the chromaticity of the excitation light and the chromaticity of the fluorescent light.

Figure 8:
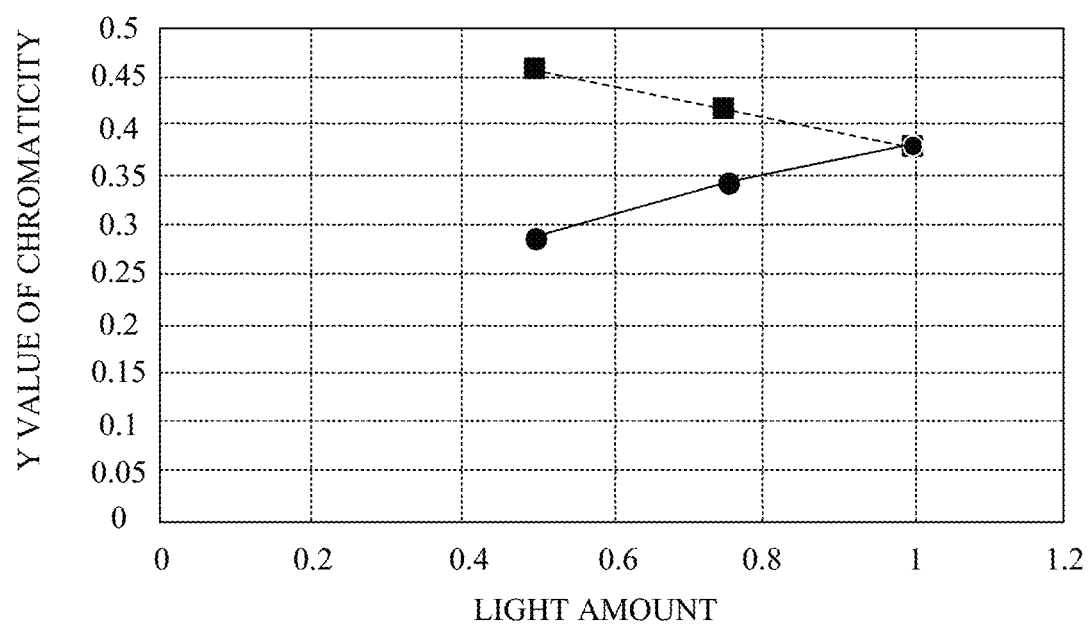
FIG. 8 is a diagram illustrating a color change depending on luminance of the light source according to the first embodiment.

In FIG. 8, ● indicates changes in the chromaticity of the light emitted from the light source apparatus 100A with respect to changes in the excitation light amount ($B2_{LD}$) from the blue LD array 2B. In this figure, the maximum value of the excitation light amount indicated by the horizontal axis is 1 (150 W in this embodiment), and they value of the light emitted from the light source apparatus 100A is indicated by the vertical axis. As indicated in the figure, when the excitation light amount is almost halved, the y value, which is the chromaticity of the light emitted from the light source apparatus 100A, decreases from 0.38 to 0.29 because the fluorescent light amount decreases.

Next, an example will be given of a case where the blue light amount from the blue LD array 1B decreases. If the excitation light amount from the blue LD array 2B is maintained, the fluorescent light amount from the fluorescent body is maintained. Thus, when the blue light amount from the blue LD array 1B decreases, the chromaticity of the light emitted from the light source apparatus 100A changes so as to approach the chromaticity of the fluorescent light via a line connecting the chromaticity of the excitation light and the chromaticity of the fluorescent light.

In FIG. 8, ■ indicates changes in the chromaticity of the light emitted from the light source apparatus 100A with respect to changes in the light amount from the blue LD array 1B. The maximum value of the blue light amount from the blue LD array 1B indicated by the horizontal axis is 1 (30 W in this embodiment), and the y value of the light emitted from the light source apparatus 100A is indicated by the vertical axis.

As indicated in the figure, when the blue light amount from the blue LD array 1B is almost halved, a ratio of the blue light amount to the fluorescent light amount decreases, and the fluorescent light becomes relatively strong. Therefore, the y value, which is the chromaticity of the light emitted from the light source apparatus 100A, increases from 0.38 to 0.46.

As described above, when the light amount from at least one of the blue LD array 1B and the blue LD array 2B changes, the chromaticity of the light emitted from the light source apparatus 100A changes. In order to hinder such a phenomenon from occurring, the controller 20 records the change in the chromaticity of the light emitted from the light source apparatus 100A while changing the light amount from the blue LD array 1B and the blue LD array 2B. For example, when the light amount from the blue LD array 2B is changed to 1, 0.75, and 0.5, they values of 0.38, 0.34, and 0.29 are recorded, and the relation thereof is recorded as a lookup table stored in a memory in the projector P. Similarly, when the light amount from the blue LD array 1B is changed to 1, 0.75, and 0.5, the y values of 0.30, 0.41, and 0.46 are recorded, and the relation thereof is recorded as a lookup table stored in the above memory.

Figure 27:
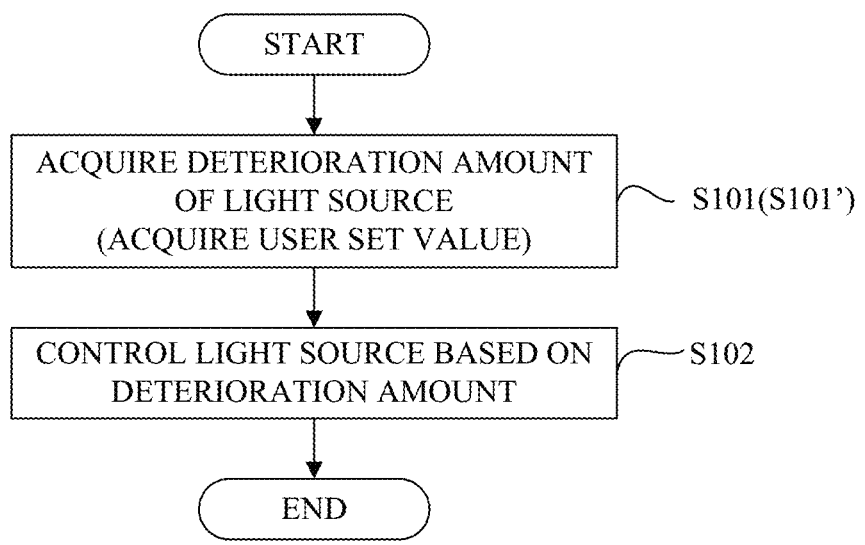
FIG. 27 is a flowchart illustrating light source control according to the first to fifth embodiments.

As the operating time of the projector P increases, the blue LD array 1B and the blue LD array 2B deteriorate, and the respective light amounts emitted from them decrease. As a result, the chromaticity of the light emitted from the light source apparatus 100A changes due to the above-described characteristic. Thus, in this embodiment, the controller 20 acquires the deterioration amounts of the blue LD array 1B and the blue LD array 2B as described in the flowchart of FIG. 27 (step S101). The deterioration amount can be acquired by measuring the light amount from each blue LD array using a photosensor or by detecting a temperature of each blue LD array using a temperature sensor. The deterioration amount may be acquired from history information on lighting time of each blue LD array. Thereafter, the controller 20 provides a control on driving of the blue LD arrays 1B and 2B as follows based on the respective change amounts of the light amounts from the blue LD arrays, the change amount being acquired from the deterioration amount (step S102).

For example, when the light amount from the blue LD array 2B is reduced by 25%, it is assumed from the lookup table that the y value of the light emitted from the light source apparatus 100A is reduced by 0.04. On the other hand, in order to reduce the y value of the light emitted from the light source apparatus 100A by 0.04, it is calculated by using the above-described lookup table that the light amount from the blue LD array 1B has to be reduced by 29%. Hence, the controller 20 increases driving current of the blue LD array 1B so as to reduce the light amount from the blue LD array 1B by 29% from an initial light amount of the projector P. Thereby, it is possible to hinder the color change of the light emitted from the light source apparatus 100A.

It is also possible for a user of the projector P to set the emitted light amount from the light source apparatus 100A (hereinafter referred to as luminance of the light source). Specifically, the controller 20 acquires a luminance set value of the light source set by the user (user set value relating to the emitted light amount) by a setting operation on the projector P, and changes the light amount from at least one of the blue LD arrays 1B and 2B based on the luminance set value (steps S101' and 102 in FIG. 27).

Here, a description will be given of a case where the user sets the luminance of the light source to 60%. When the illumination of the light source is set to 60% by the user, the light amount from the blue LD array 2B is reduced so that the light amount emitted from the light source apparatus 100A is 60% of the maximum output. However, due to the above-described fluorescence saturation characteristic of the fluorescent body, when the light amount from the blue LD array 2B is set to 60%, the fluorescent light amount has a value larger than 60%. In this embodiment, the controller 20 sets the light amount from the blue LD array 2B to 50%, so that the fluorescent light amount from the fluorescent body is set to 60%. When the light amount from the blue LD array 2B is set to 50%, it is assumed by using the lookup table that the y value of the light emitted from the light source apparatus 100A is 0.34, which is smaller by 0.04 than the y value when the luminance of the light source is 100%.

On the other hand, in order to reduce, by 0.04, the y value of the light emitted from the light source apparatus 100A, it is calculated by using the above-described lookup table that the light amount from the blue LD array 1B has to be reduced by 29%. Thus, the controller 20 increases the driving current of the blue LD array 1B so as to reduce the light amount from the blue LD array 1B by 29%. As a result, the luminance of the light source set by the user can be provided, and the color change in the light emitted from the light source apparatus 100A can be hindered.

As described above, the controller 20 in this embodiment controls, based on a change in the light emission amount from at least one of the blue LD arrays 1B and 2B, the light emission amount from at least one of the blue LD arrays 1B and 2B so that the change amounts in the light emission amounts from the blue LD arrays 1B and 2B are different from each other, or so that a ratio between the light emission amounts from the blue LD arrays 1B and 2B changes. Thereby, even if the light emission amount from at least one of the blue LD arrays 1B and 2B changes, it is possible to reduce a change in the color of the light emitted from the light source apparatus 100A.

Second Embodiment

Next, the second embodiment will be described. A light source apparatus 100A' according to this embodiment has the same configuration as that of the first embodiment. That is, the light source apparatus 100A' includes a blue LD array 1B as a first light source configured to emit blue light B1 (wavelength 455 nm) as first wavelength light and first polarized light, and a blue LD array 2B as a second light source configured to emit blue light B2 (wavelength 465 nm) as second wavelength light and second polarized light. In this embodiment, the blue light B2 has a different wavelength and a polarization direction different by 90 degrees, with respect to the blue light B1.

An optical path of blue light B1, an optical path of blue light B2, and an optical path of fluorescent light are as described with reference to FIGS. 4, 5 and 6, respectively, in the first embodiment.

Figure 9:
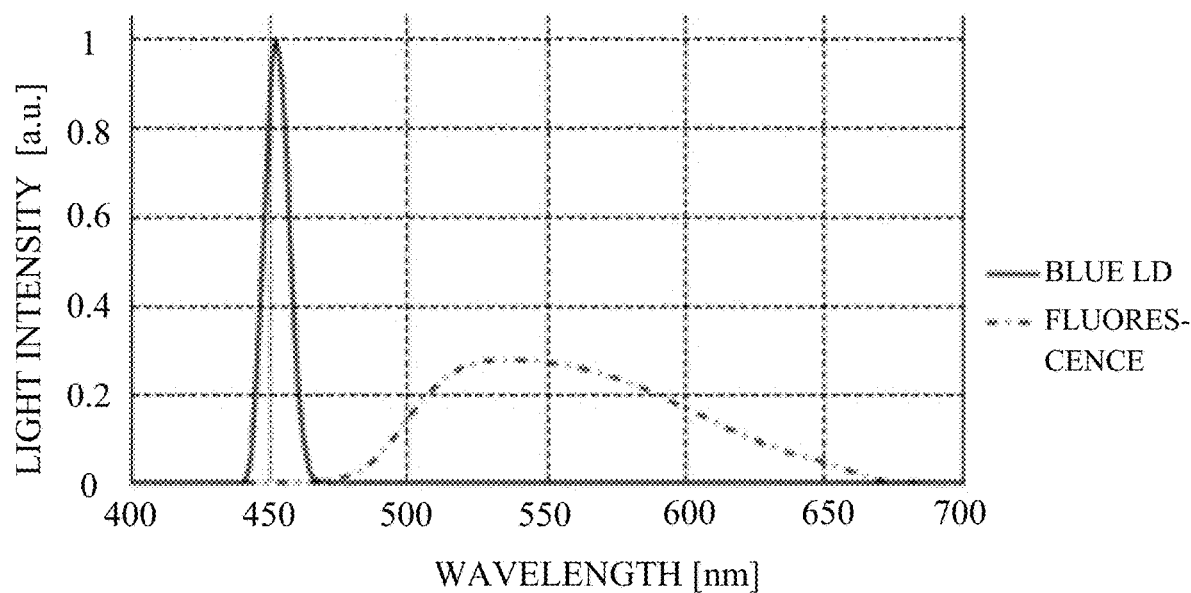
FIG. 9 is a diagram illustrating a spectral distribution of light from the light source apparatus according to the second embodiment.

A description will be given of the reason why the light source apparatus 100A' in this embodiment can reproduce a wider color gamut than conventional device with reference to FIG. 9. FIG. 9 indicates a spectral distribution of light emitted from the light source apparatus 100A'. The horizontal axis indicates a wavelength, and the vertical axis indicates a light intensity. The wavelength of the blue LD array 1B is 465 nm, and the blue light having this wavelength has a chromaticity close to a blue chromaticity of the sRGB color gamut. Since the blue light having this wavelength is mainly projected from the light source apparatus 100A', a blue hue can be improved.

On the other hand, the wavelength of the blue LD array 2B is 455 nm, and is inferior to the blue LD array 1B in terms of a hue, but has a high excitation efficiency as excitation light which irradiates a YAG fluorescent body used in this embodiment. Therefore, it is possible to perform fluorescence conversion more efficiently than in the first embodiment.

This embodiment also has a problem of a luminance saturation of a fluorescent body included in a yellow fluorescent body layer. In xy chromaticity, light from each of the blue LD array 1B and the blue LD array 2B has a chromaticity of (0.13, 0.06), and the fluorescent light has a chromaticity of (0.41, 0.57). As described in the first embodiment, as an excitation light amount from the blue LD array 2B increases, a fluorescent light amount also increases, but light that returns as the excitation light, which was not converted into fluorescent light, gradually increases. As a result, the fluorescent light amount emitted from the fluorescent body decreases, indicating a tendency of saturation.

On the other hand, if the blue light amount from the blue LD array 1B is maintained, the blue light amount emitted from the light source apparatus 100A' is maintained. Hence, when the excitation light amount from the blue LD array 2B increases and the fluorescent light amount increases, a chromaticity of the light emitted from the light source apparatus 100A' changes from the chromaticity of the fluorescent light so as to approach the chromaticity of the excitation light via a line connecting the chromaticity of the excitation light and the chromaticity of the fluorescent light.

Changes in the chromaticity of the light emitted from the light source apparatus 100A' with respect to changes in an excitation light amount ($B2_{LD}$) from the blue LD array 2B and changes in a blue light amount ($B1_{LD}$) of the blue LD array 1B are as described in the first embodiment with reference to FIG. 8.

This embodiment also hinders a phenomenon that the chromaticity of the light from the light source apparatus 100A' is changed by the change in the light amount from at least one of the blue LD arrays 1B and 2B. Thus, as described in the first embodiment, a controller 20 stores, as a lookup table in a memory, a relation between the light amount and the chromaticity of the light emitted from the light source apparatus 100A' while changing the respective light amounts from the blue LD arrays 1B and 2B. Further, respective deterioration amounts of the blue LD arrays 1B and 2B are acquired, the increase amount of the light amount from the blue LD array 1B corresponding to the decrease in the light amount from the blue LD array 2B is calculated by using the lookup table, and driving current of blue LD array 1B is increased.

As described in the first embodiment, the light amount from at least one of the blue LD arrays 1B and 2B may be changed according to a luminance set value of the light source set by a user of the projector P.

Third Embodiment

Figure 10:
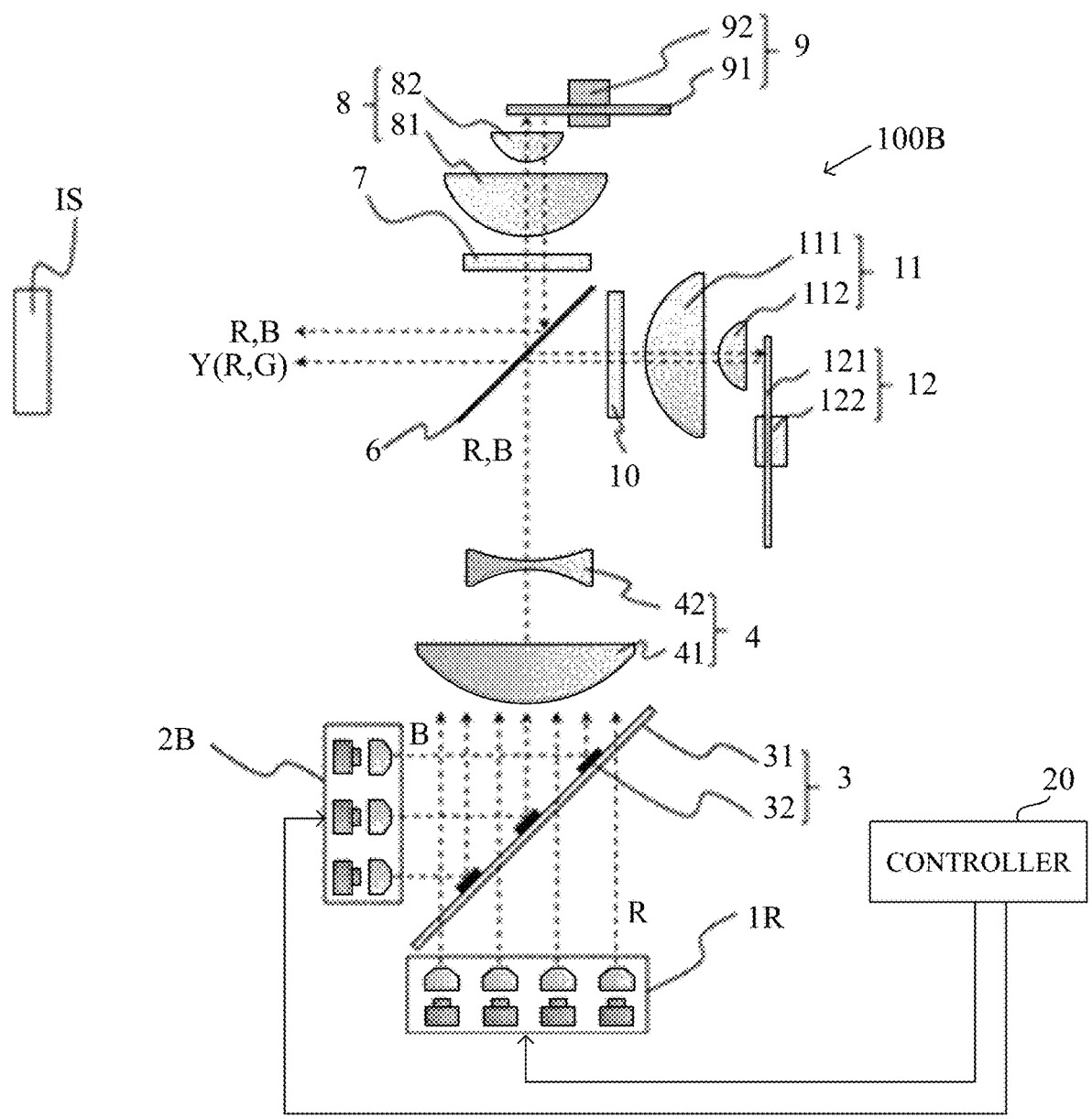
FIG. 10 is a diagram illustrating a configuration of a light source apparatus according to the third embodiment.

FIG. 10 illustrates a configuration of a light source apparatus 100B according to the third embodiment. The light source apparatus 100B includes a red LD array 1R as a first light source configured to emit red light R (wavelength 640 nm) as first wavelength light and first polarized light, and a blue LD array 2B as a second light source configured to emit blue light B (wavelength 455 nm) as second wavelength light and second polarized light. The blue light B has a different wavelength and a polarization direction different by 90 degrees, with respect to the red light R. The blue LD array 2B includes a plurality of GaN semiconductor LDs, and the red LD array 1R includes a plurality of GaAs semiconductor LDs. However, this is merely an example, and other semiconductor LDs may be used. Red light is light having a spectral distribution in which a wavelength with maximum intensity or full width at half maximum is included in a band of 600-750 nm.

The light source apparatus 100B further includes a light combiner 3 having a transmissive area for transmitting the red light R and a reflective area for reflecting the blue light B. The light combiner 3 has the same configuration as illustrated in FIGS. 3A to 3C and most of the red light R from the red LD array 1R is guided to the light combiner 3. The light combiner 3 may have a configuration in which the red light R and the blue light B are combined by transmitting and reflecting them depending on their polarization directions.

The light source apparatus 100B further includes a positive lens 41, a negative lens 42, and a compression optical system 4 configured to narrow a width of the light from the light combiner 3 as in the first embodiment. The light source apparatus 100B further includes a polarized light splitter 6, a λ/4 plate 7, a collective optical system 8 including collective lenses 81 and 82, a diffuser unit 9, a λ/4 plate 10, a collective optical system 11 including collective lenses 111 and 112, and a fluorescent body unit 12, as in the first embodiment. The configurations of the diffuser unit 9 and the fluorescent body unit 12 are the same as those in the first embodiment.

The light source apparatus 100B also includes a controller 20, and the controller 20 executes processing for controlling driving of the red LD array 1R and the blue LD array 2B (that is, a light emission amount) according to a computer program.

Figure 11:
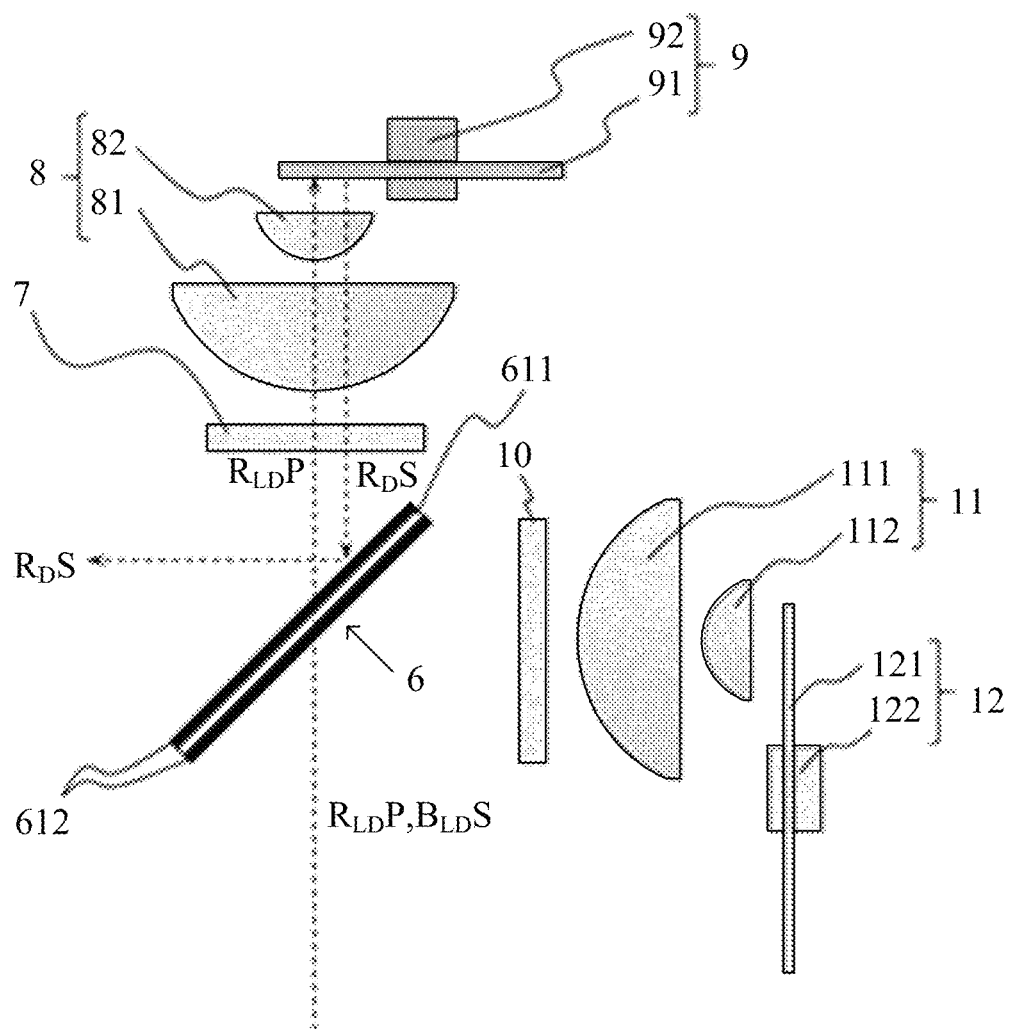
FIG. 11 is a diagram illustrating an optical path of red light in the light source apparatus according to the third embodiment.

FIG. 11 illustrates an optical path when red light $R_{LD}$ from the red LD array 1R is guided to the illumination optical system IS via the diffuser unit 9. The red light $R_{LD}$ from the red LD array 1R enters a polarized light splitting film 612 of the polarized light splitter 6, accompanying with blue light $B_{LD}$ from the blue LD array 2B. In the drawing, the red light $R_{LD}$ is indicated as $R_{LD}P$ because the red light $R_{LD}$ is P-polarized light with respect to the polarized light splitting film 612, and the blue light $B_{LD}$ is indicated as $B_{LD}S$ because the blue light $B_{LD}$ is S-polarized light. The polarized light splitting film 612 is provided on respective entire surfaces of both surfaces of the transparent substrate 611.

Figure 14:
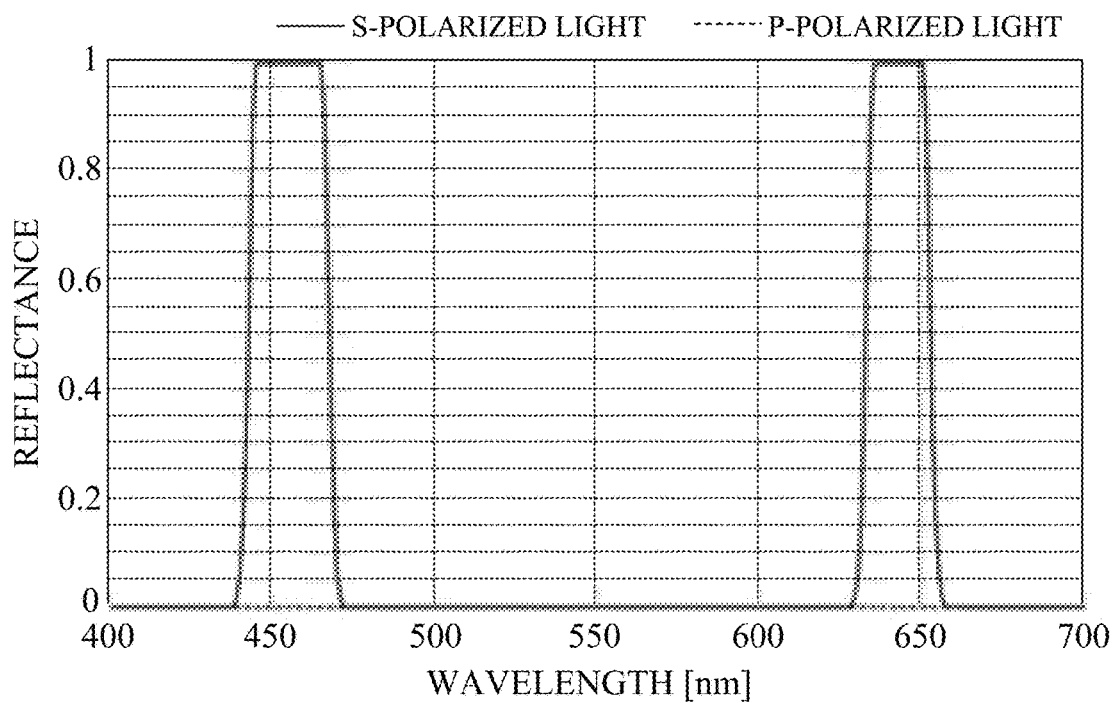
FIG. 14 is a diagram illustrating a characteristic of a polarized light splitting film according to the third embodiment.

FIG. 14 illustrates a characteristic of the polarized light splitting film 612. The polarized light splitting film 612 has a characteristic of performing polarization splitting for the red light $R_{LD}S$ from the red LD array 1R and the blue light $B_{LD}P$ from the blue LD array 2B, and transmitting light having other wavelengths regardless of its polarization direction.

The red light $R_{LD}P$ transmitted through the polarized light splitting film 612 is converted into circularly polarized light by the λ/4 plate 7, collected by the collective optical system 8 and emitted to the diffuser wheel 91. The red light $R_{LD}$ diffused by the diffuser wheel 91 is collimated by the collective optical system 8, converted into S-polarized light (polarization rotated light) by the λ/4 plate 7, and is emitted to the polarized light splitting film 612. The red light $R_{LD}S$, which is converted into S-polarized light, is reflected by the polarized light splitting film 612 and guided to the illumination optical system IS.

Figure 12:
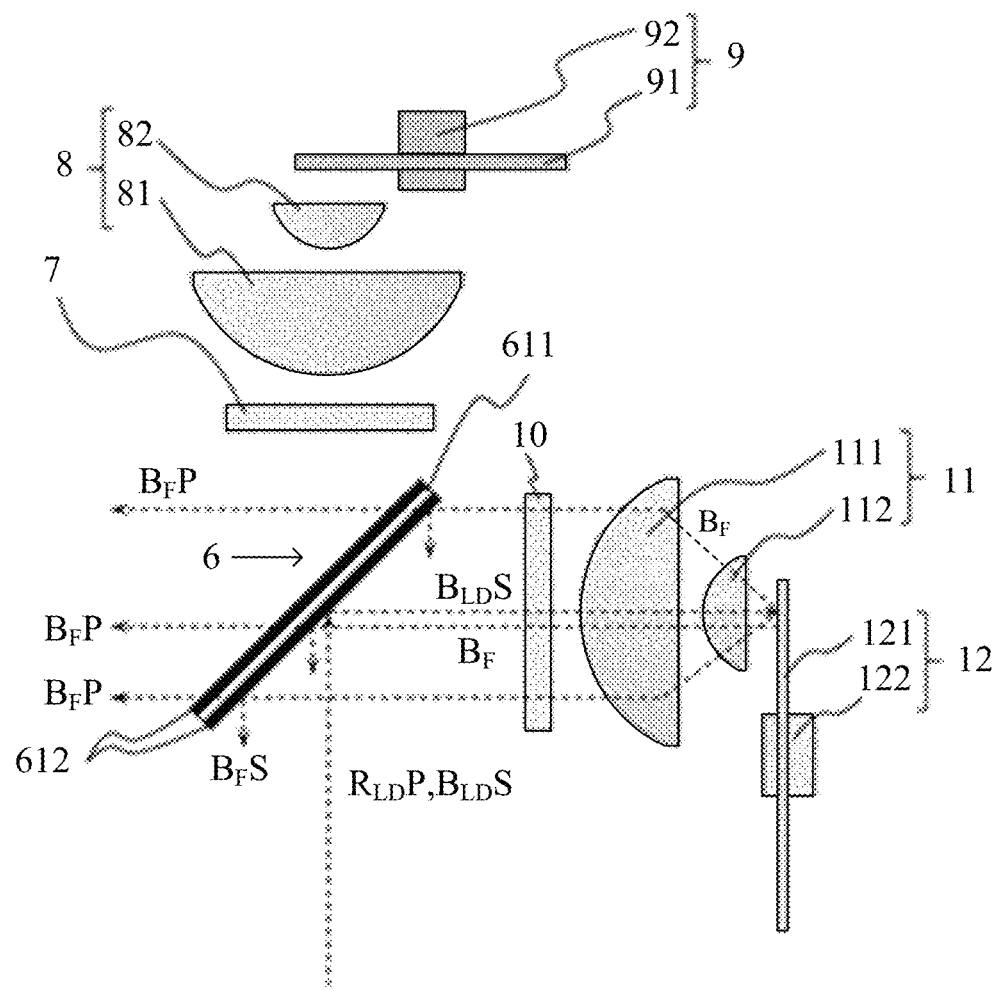
FIG. 12 is a diagram illustrating an optical path of blue light in the light source apparatus according to the third embodiment.

FIG. 12 illustrates an optical path when the blue light $B_{LD}$ from the blue LD array 2B is guided to the illumination optical system IS via the fluorescent body unit 12. As described with reference to FIG. 11, the blue light $B_{LD}S$, which is S-polarized light, is reflected by the polarized light splitting film 612. The reflected blue light $B_{LD}S$ is converted into circularly polarized light by the λ/4 plate 10, collected by the collective optical system 11, and emitted to a yellow fluorescent body layer on the fluorescent body wheel 121. The yellow fluorescent body layer performs wavelength conversion so as to convert part of the blue light as excitation light into yellow light (red light+green light) as fluorescent light having wavelength longer than the wavelength of the blue light.

Non-converted blue light $B_F$ as non-converted light of the blue light $B_{LD}S$, which has not been wavelength-converted by the yellow fluorescent body layer, is collimated by the collective optical system 11, passes through the λ/4 plate 10, and enters the polarized light splitting film 612. Polarization directions of the non-converted blue light $B_F$ entering the polarized light splitting film 612 are not aligned, and an S-polarized light component $B_FS$ of the non-converted blue light $B_F$ is reflected by the polarized light splitting film 612 and returned to the blue LD array 2B. A P-polarized light component $B_FP$ passes through the polarized light splitting film 612 and is guided to the illumination optical system IS.

Figure 13:
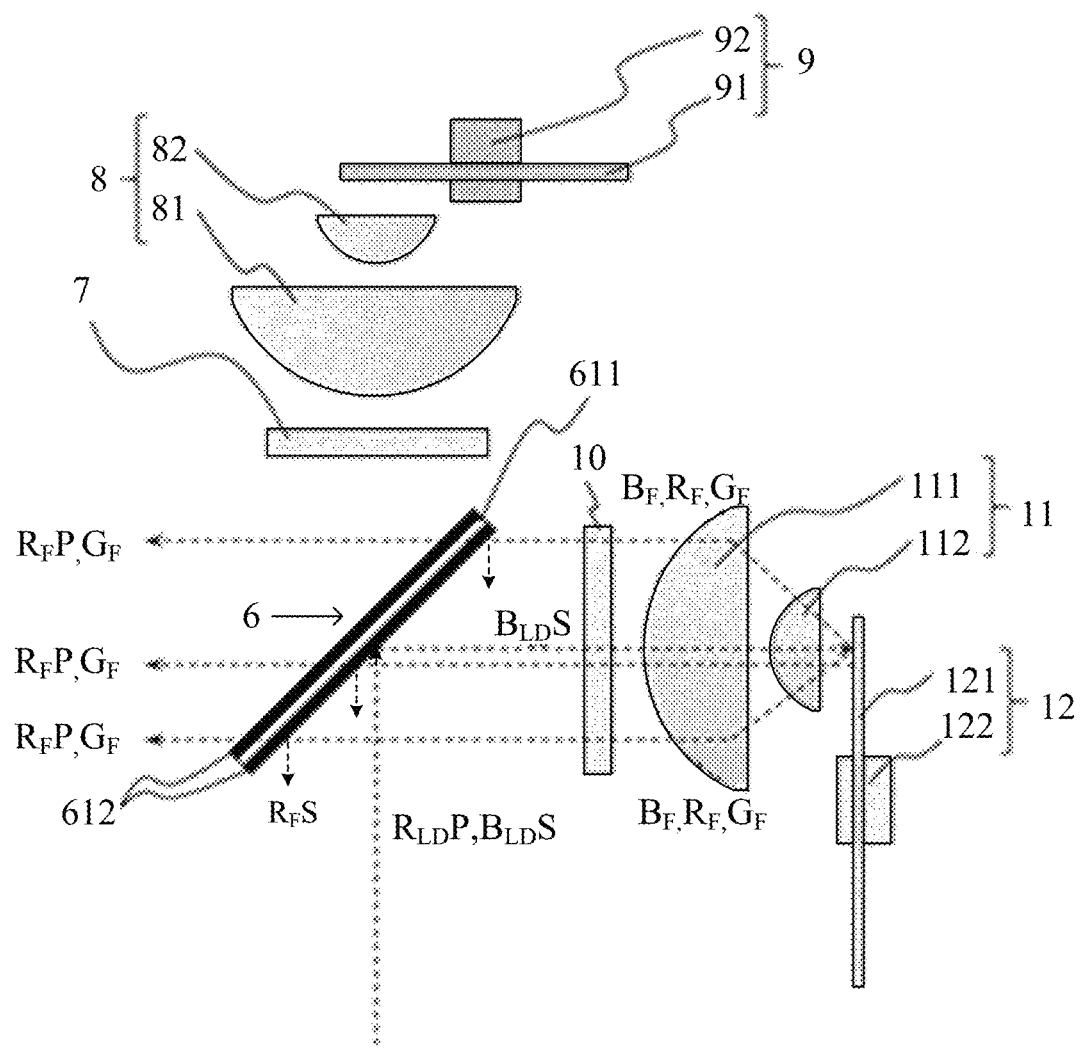
FIG. 13 is a diagram illustrating an optical path of fluorescent light in the light source apparatus according to the third embodiment.

FIG. 13 illustrates an optical path when fluorescent light ($R_F$, $G_F$) from the fluorescent body unit 12 is guided to the illumination optical system IS. As described above, fluorescent light including green fluorescent light $G_F$ and red fluorescent light $R_F$ is emitted from the yellow fluorescent body layer on the fluorescent body wheel 121. The green fluorescent light $G_F$ entering the polarized light splitting film 612 having the above-described characteristic is guided to the illumination optical system IS through the polarized light splitting film 612 regardless of its polarization direction. On the other hand, of the red fluorescent light $R_F$ entering the polarized light splitting film 612, an S-polarized light component $R_FS$ is reflected by the polarized light splitting film 612 and returned to the side closer to the red LD array 1R, and only a P-polarized light component $R_FP$ is transmitted through the polarized light splitting film 612 and guided to the illumination optical system IS.

As described above, the light source apparatus 100B illustrated in FIG. 10 combines yellow light Y, which includes red light R and green light G, and blue light B with the polarized light splitter 6 and emits the light to the illumination optical system IS as emitted light.

Figure 15:
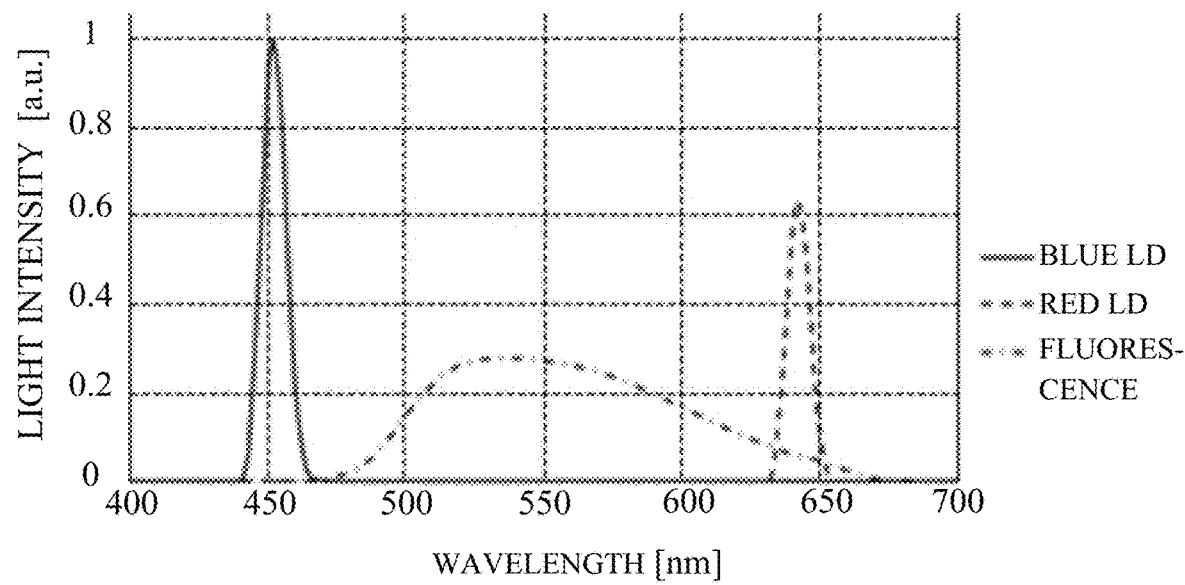
FIG. 15 is a diagram illustrating a spectral distribution of light from the light source apparatus according to the third embodiment.

A description will be given of the reason why the light source apparatus 100B in this embodiment can reproduce a wider color gamut than conventional device with reference to FIG. 15. FIG. 15 indicates a spectral distribution of light emitted from the light source apparatus 100B. The horizontal axis indicates a wavelength, and the vertical axis indicates a light intensity. The wavelength of the red LD array 1R is 640 nm, and the red light having this wavelength has a chromaticity close to a red chromaticity of the sRGB color gamut. Since the red light having this wavelength is mainly projected from the light source apparatus 100B, a red hue can be improved.

On the other hand, the wavelength of the blue LD array 2B is 455 nm, and has a high excitation efficiency as excitation light which irradiates a YAG fluorescent body used in this embodiment. Therefore, it is possible to perform fluorescence conversion more efficiently than in the first embodiment.

The light source apparatus 100B in this embodiment can emit red light from the red LD array in addition to blue light from the blue LD array and fluorescent light from the yellow fluorescent body layer each of which can be emitted by conventional light source apparatuses. That is, in the projector P provided with the light source apparatus 100B, as indicated by FIG. 15, the red light from the red LD array can also be used as red light used for image projection, in addition to the red light included in the fluorescent light from the yellow fluorescent body layer. Thereby, the projector P using the light source apparatus 100B in this embodiment can display a brighter projected image than conventional projectors.

In order to increase the light amount of red light included in the fluorescent light, it is conceivable to increase the number of blue LDs for increasing the light amount of blue light entering the yellow fluorescent body layer. However, an increase amount of the red light included in the fluorescent light is limited because there is a limit for the amount of blue light, which can be converted into fluorescent light, due to a luminance saturation characteristic of the fluorescent body. On the other hand, the light source apparatus 100B in this embodiment does not increase the light amount of the red light included in the fluorescent light, but uses the red LD array so as to increase the light amount of the red light. Therefore, it is possible to display a projected image that is brighter than conventional ones, without being limited by the limit of the luminance saturation characteristic of the fluorescent body.

Further, in a conventional projector, in a case where part of fluorescent light is used as red light, a red light amount is insufficient, and thus when an all-white image, which makes an entire surface white, is projected, it is necessary to adjust balance in white color by reducing a green light amount and a blue light amount and balancing the green and blue light amounts with the small red light amount. More specifically, if a light modulator is reflective type, it is necessary to reduce a reflectance for green light and blue light in the light modulator for bicolor light and to reduce a green light amount and a blue light amount guided to the screen. As a result, luminance of the all-white image is lowered in the conventional projector. On the other hand, in the light source apparatus 100B in this embodiment, since the red light amount is increased by using red light from the red LD array, it is not necessary to reduce a green light amount and a blue light amount in the light modulator, and thus decrease in luminance can be reduced.

Further, the light source apparatus 100B in this embodiment can reproduce wider color gamut than the conventional devices by, for example, including a red LD configured to emit red light having a wavelength longer than 640 nm in addition to the red LD in which the red LD array 1R emits red light of 640 nm.

With the light source apparatus 100B in this embodiment, since light from two light sources are combined by one light combiner, it is possible to acquire an effect of improved luminance while the light source apparatus is hindered from increasing its size.

This embodiment also has a problem of a luminance saturation of a fluorescent body included in a yellow fluorescent body layer. In xy chromaticity, light from the blue LD array 2B has a chromaticity of (0.14, 0.04), and the fluorescent light has a chromaticity of (0.41, 0.57). Light from the red LD array 1R has a chromaticity of (0.72, 0.28).

As described in the first embodiment, as an excitation light amount from the blue LD array 2B increases, a fluorescent light amount also increases, but light that returns as the excitation light, which was not converted into fluorescent light, gradually increases. As a result, the fluorescent light amount emitted from the fluorescent body decreases, indicating a tendency of saturation. Hence, when the excitation light amount from the blue LD array 2B increases, both the fluorescent light amount and the excitation light amount, which has not been fluorescently converted, increase, but the excitation light amount relatively increases due to the luminance saturation characteristic of the fluorescent body. Therefore, a chromaticity of the light emitted from the light source apparatus 100B changes from the chromaticity of the fluorescent light so as to approach the chromaticity of the excitation light via a line connecting the chromaticity of the excitation light and the chromaticity of the fluorescent light. For this reason, in a conventional projector, when an all-white image is to be projected, it is necessary to balance the fluorescent light and the excitation light so that the chromaticity is maintained. More specifically, when the light modulator is reflective type, a reflectance in the light modulator for excessive color light has to be lowered for reducing the light amount guided to the screen, so that the chromaticity is maintained.

On the other hand, in a case where the red LD array 1R is provided as in this embodiment, when adjustment is performed for maintaining the chromaticity of all white, it is necessary not only to adjust the light modulator, but to maintain the chromaticity of the single red color so that the color gamut is maintained. The light emitted from the light source apparatus 100B in this embodiment includes red fluorescent light and red light from the red LD array 1R, and the chromaticity is determined by a combined spectrum thereof, and thus when mixing ratios of the red fluorescent light and the red light from the red LD array 1R are different, the chromaticity changes. Hence, in this embodiment, the red light amount from the red LD array 1R is adjusted so that the mixing ratios of the red fluorescent light and the red light from the red LD array 1R are equal.

Figure 16:
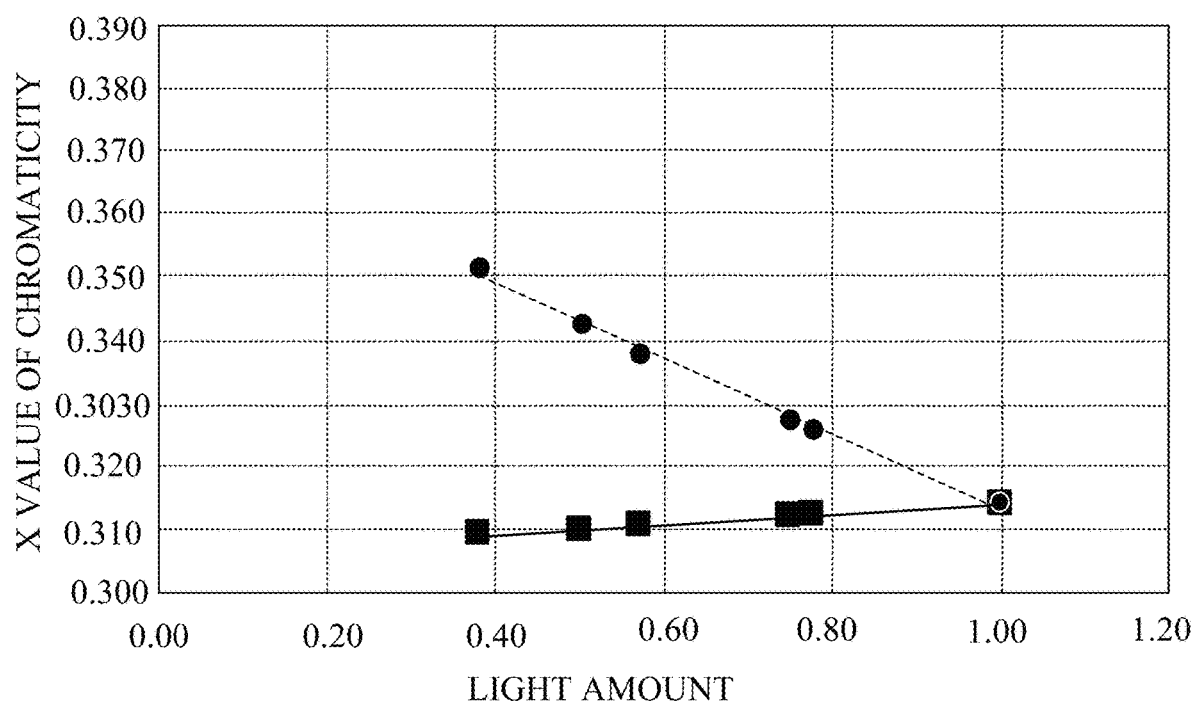
FIG. 16 is a diagram illustrating a color change depending on luminance of the light source according to the third embodiment.

In FIG. 16, ● indicates changes in the chromaticity of the light emitted from the light source apparatus 100B with respect to changes in the excitation light amount ($B_{LD}$) from the blue LD array 2B. In this figure, the maximum value of the excitation light amount indicated by the horizontal axis is 1 (150 W in this embodiment), and the x value of the light emitted from the light source apparatus 100B is indicated by the vertical axis.

As indicated in the figure, when the excitation light amount is almost halved, the x value, which is the chromaticity of the light emitted from the light source apparatus 100B, increases from 0.314 to 0.343 because the light amount returned as the excitation light, which was not converted into fluorescent light, decreases and the fluorescent light amount increases.

Next, an example will be given of a case where the red light amount from the red LD array 1R decreases. If the excitation light amount from the blue LD array 2B is maintained, the fluorescent light amount from the fluorescent body is maintained. Thus, when the red light amount from the red LD array 1R decreases, the chromaticity of the light emitted from the light source apparatus 100B changes so as to approach the chromaticity of red light from the red LD array 1R.

In FIG. 16, ■ indicates changes in the chromaticity of the light emitted from the light source apparatus 100B with respect to changes in the red light amount from the red LD array 1R. The maximum value of the red light amount is 1 (15 W in this embodiment), and the x value of the light emitted from the light source apparatus 100B is indicated by the vertical axis. As indicated by the figure, when the red light amount from the red LD array 1B is almost halved, a ratio of the red light amount to the fluorescent light amount decreases, and the fluorescent light becomes relatively strong. Therefore, the x value, which is the chromaticity of the light emitted from the light source apparatus 100B, decreases from 0.314 to 0.310.

As described above, when the light amount from at least one of the red LD array 1R and the blue LD array 2B changes, the chromaticity of the light emitted from the light source apparatus 100B changes. In order to hinder such a phenomenon from occurring, the controller 20 records the change in the chromaticity of the light emitted from the light source apparatus 100B while changing the light amount from the red LD array 1R and the blue LD array 2B. For example, when the light amount from the blue LD array 2B is changed to 1, 0.75, and 0.5, the x values of 0.314, 0.328, and 0.343 are recorded, and the relation thereof is recorded as a lookup table stored in a memory in the projector P. Similarly, when the light amount from the red LD array 1R is changed to 1, 0.75, and 0.5, the x values of 0.314, 0.312, and 0.310 are recorded, and the relation thereof is recorded as a lookup table stored in the above memory.

As the operating time of the projector P increases, the red LD array 1R and the blue LD array 2B deteriorate, and the respective light amounts emitted from them decrease. As a result, the chromaticity of the light emitted from the light source apparatus 100B changes due to the above-described characteristic. Thus, in this embodiment, the controller 20 acquires the deterioration amounts of the red LD array 1R and the blue LD array 2B as described in the flowchart of FIG. 27 (step S101), and thereafter, provides a control on driving of the red and blue LD arrays 1R and 2B based on the respective change amounts of the light emission amounts of the red and blue LD arrays 1R and 2B (step S102). The method of acquiring the deterioration amount is as described in the first embodiment.

For example, when the light amount from the blue LD array 2B is reduced by 50%, it is assumed from the lookup table that the x value of the light emitted from the light source apparatus 100B is reduced by 0.025. On the other hand, when the x value of the light emitted from the light source apparatus 100B is reduced by 0.025, the fluorescent light amount decreases by 45%. Thus, it is calculated by using the lookup table that the light amount from the red LD array 1R has to be reduced by 45%. Hence, the controller 20 increases driving current of the red LD array 1R so as to reduce the light amount from the red LD array 1R by 45% from an initial light amount of the projector P (step S102). Thereby, it is possible to hinder the color change of the light emitted from the light source apparatus 100B.

It is also possible for a user of the projector P to set luminance of the light source. Specifically, the controller 20 acquires a luminance set value of the light source set by the user by a setting operation on the projector P, and changes the light amount from the blue LD array 2B based on the luminance set value (steps S101' and 102 in FIG. 27).

Here, a description will be given of a case where the user sets the luminance of the light source to 55%. When the illumination of the light source is set to 55% by the user, the controller 20 reduces the light amount from the blue LD array 2B so that the light amount emitted from the light source apparatus 100B is 55% of the maximum output. However, due to the above-described fluorescence saturation characteristic of the fluorescent body, when the light amount from the blue LD array 2B is set to 55%, the fluorescent light amount has a value larger than 55%. Thus, the controller 20 sets the light amount from the blue LD array 2B to 50%, so that the fluorescent light amount from the fluorescent body is set to 55%. When the light amount from the blue LD array 2B is set to 50%, it is assumed by using the lookup table that the x value of the light emitted from the light source apparatus 100B is 0.343, which is smaller by 0.029 than the x value when the luminance of the light source is 100%.

On the other hand, since the x value of the light emitted from the light source apparatus 100B is reduced by 0.029, it is calculated by using the above-described lookup table that the red fluorescent light amount is reduced by 45%, and the light amount from the red LD array 1R has to be reduced by the same amount. Thus, the controller 20 reduces driving current of the red LD array 1R so as to reduce the light amount from the red LD array 1R by 45%. As a result, the luminance of the light source set by the user can be provided, and the color change in the light emitted from the light source apparatus 100B can be hindered.

As described above, the controller 20 in this embodiment controls, based on a change in the light emission amount from at least one of the red and blue LD arrays 1R and 2B, the light emission amount from at least one of the red and blue LD arrays 1R and 2B so that the change amounts in the light emission amounts from the red and blue LD arrays 1R and 2B are different from each other, or so that a ratio between the light emission amounts from the red and blue LD arrays 1R and 2B changes. Thereby, even if the light emission amount from at least one of the red and blue LD arrays 1R and 2B changes, it is possible to reduce a change in the color of the light emitted from the light source apparatus 100B.

In the light source apparatus 100B illustrated in FIG. 10, the red light from the red LD array 1R passes through the light combiner 3, and blue light from the blue LD array 2B is reflected by the light combiner 3. In general, in a comparison between a light amount loss when light is reflected by a reflective film such as aluminum and a light amount loss when light is transmitted through glass, the light amount loss in transmission is smaller. Therefore, when the red light from the red LD array 1R is transmitted through the light combiner 3 as in the light source apparatus 100B, it is possible to supplement more red light that has conventionally been insufficient as described above.

As illustrated in FIG. 10, the insufficient amount of red light can be further reduced by making the number of red LDs included in the red LD array 1R larger than the number of blue LDs included in the blue LD array 2B.

Further, as illustrated in FIG. 3A, the light combiner 3 may be configured so that an area of the transmissive area 31T is larger than an area of the reflective area 31R. In other words, the width W1 of the transmissive area 31T may be wider than the width W2 of the reflective area 31R. This configuration makes it possible to hinder the light from the red LD array 1R from being blocked by the reflective portion 32, even if an arrangement position of the red LD array 1R deviates from a normal position due to an attachment error or the like.

Fourth Embodiment

Figure 17:
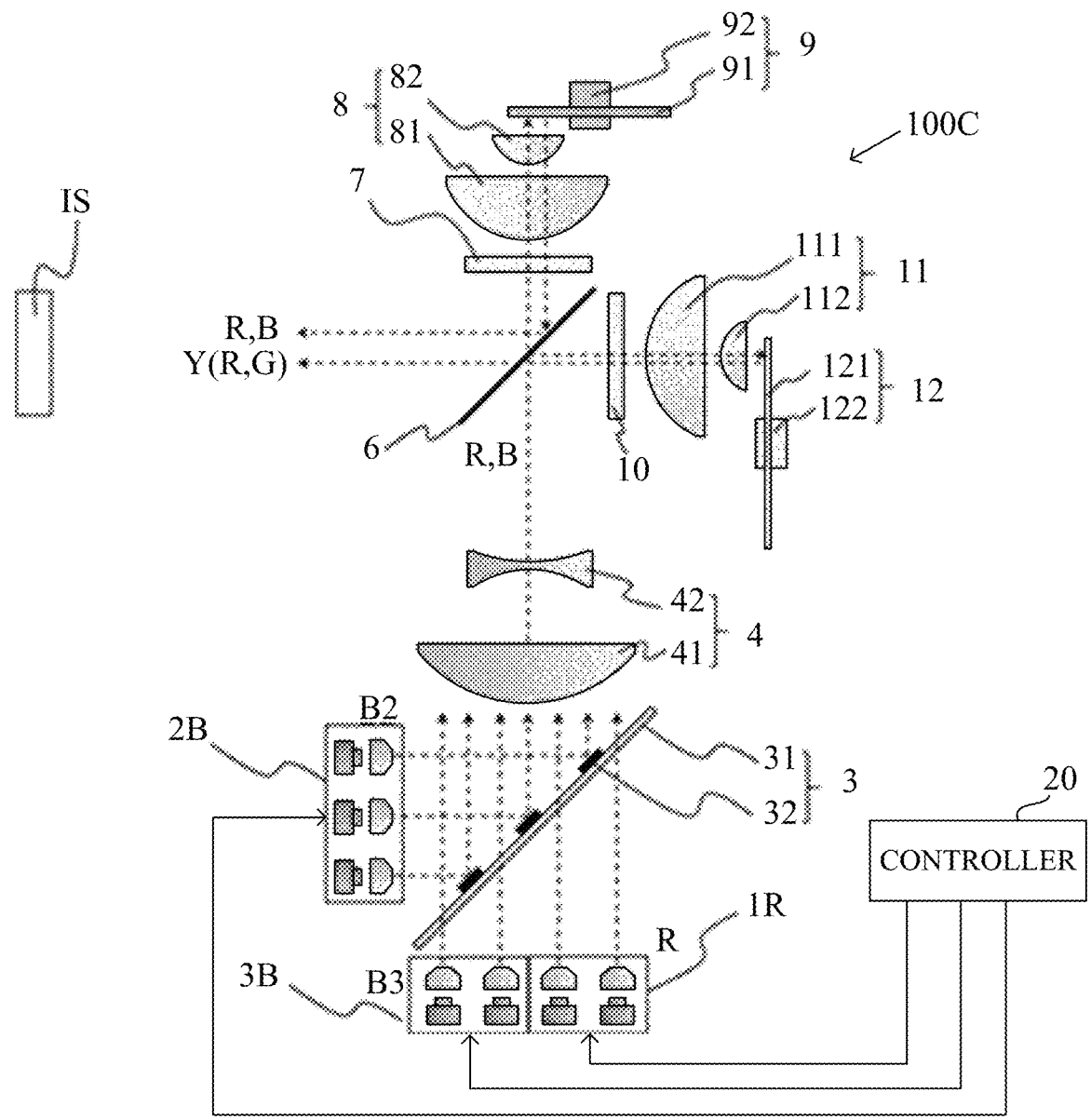
FIG. 17 is a diagram illustrating a configuration of a light source apparatus according to the fourth embodiment.

FIG. 17 illustrates a configuration of a light source apparatus 100C according to the fourth embodiment. The light source apparatus 100C includes a red LD array 1R as a first light source configured to emit red light R (wavelength 640 nm) as first wavelength light and first polarized light, a blue LD array 2B as a second light source configured to emit blue light B2 (wavelength 455 nm) as second wavelength light and second polarized light, and a blue LD array 3B as a third light source configured to emit blue light B3 (wavelength 465 nm) as third wavelength light and third polarized light. The blue light B3 has a wavelength different from the blue light B2. The red light R and the blue light B3 have the same polarization direction, which is different by 90 degrees with respect to blue light B2. The blue LD array 3B as the third light source can be regarded as another first light source different from the red LD array 1R, which is the first light source, with respect to the blue LD array 2B, which is the second light source.

The light source apparatus 100C further includes a light combiner 3 having a transmissive area for transmitting the red light R and a reflective area for reflecting the blue light B2 and B3. The light combiner 3 has the same configuration as the light combiner 3 described with reference to FIGS. 3A to 3C in the first embodiment. That is, the light combiner 3 has a configuration in which an aluminum reflective film 32 as a reflective portion is provided in a reflective area 31R, which is a plurality of partial areas, on a surface 31A closer to the blue LD array 2B (closer to the second light source) among both surfaces of a transparent substrate 31. The transmissive area is a plurality of areas 31T in which the aluminum reflective film 32 is not provided on the transparent substrate 31. Further, an antireflection film is provided on a surface 31B closer to the red LD array 1R and the blue LD array 3B (closer to the first and third light source) among both surfaces of the transparent substrate 31. Thereby, it is possible to guide most of the red light R and the blue light B3 from the red LD array 1R and the blue LD array 1B to the light combiner 3.

The light combiner 3 may have a configuration in which the red light R, the blue light B3, and the blue light and B2 are combined by transmitting and reflecting them depending on their polarization directions.

The light source apparatus 100C further includes a positive lens 41, a negative lens 42, and a compression optical system 4 configured to narrow a width of the light from the light combiner 3 as in the first embodiment. The light source apparatus 100C further includes a polarized light splitter 6, a λ/4 plate 7, a collective optical system 8 including collective lenses 81 and 82, a diffuser unit 9, a λ/4 plate 10, a collective optical system 11 including collective lenses 111 and 112, and a fluorescent body unit 12 as in the first embodiment. The configurations of the diffuser unit 9 and the fluorescent body unit 12 are the same as those in the first embodiment.

The light source apparatus 100C also includes a controller 20, and the controller 20 executes processing for controlling driving of the red LD array 1R, the blue LD array 2B, and the blue LD array 3B (that is, a light emission amount) according to a computer program.

Figure 18:
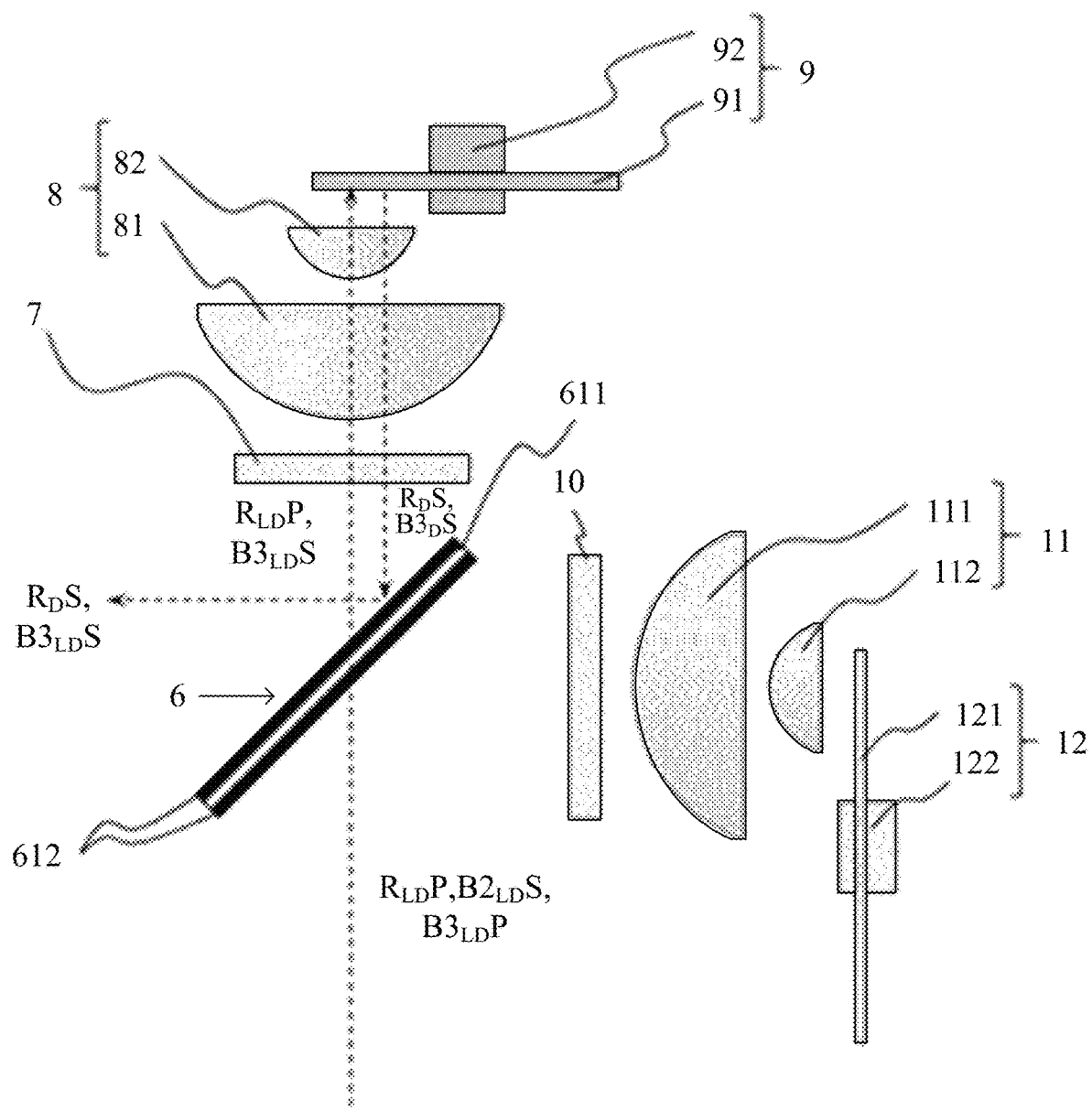
FIG. 18 is a diagram illustrating an optical path of first blue light in the light source apparatus according to the fourth embodiment.

FIG. 18 illustrates an optical path when red light $R_{LD}$ from the red LD array 1R and blue light $B3_{LD}$ from the blue LD array 3B are guided to the illumination optical system IS via the diffuser unit 9. The red light $R_{LD}$ from the red LD array 1R and the blue light $B3_{LD}$ from the blue LD array 3B enter a polarized light splitting film 612 of the polarized light splitter 6, accompanying with blue light $B2_{LD}$ from the blue LD array 2B. In the drawing, the red light $R_{LD}$ and the blue light $B3_{LD}$ are indicated as $R_{LD}P$ and $B3_{LD}P$, respectively, because the red light $R_{LD}$ and the blue light $B3_{LD}$ are P-polarized light with respect to the polarized light splitting film 612, and the blue light $B2_{LD}$ is indicated as $B2_{LD}S$ because the blue light $B2_{LD}$ is S-polarized light. The polarized light splitting film 612 is provided on respective entire surfaces of both surfaces of the transparent substrate 611.

The polarized light splitting film 612 in this embodiment transmits the red light $R_{LD}P$ and the blue light $B3_{LD}P$ and reflects the blue light $B3_{LD}P$ and blue light $B2_{LD}S$. The red light $R_{LD}P$ and the blue light $B3_{LD}P$, which are P-polarized light transmitted through the polarized light splitting film 612 are converted into circularly polarized light by the λ/4 plate 7, collected by the collective optical system 8 and emitted to the diffuser wheel 91. The red light $R_{LD}$ and the blue light $B3_{LD}$ diffused by the diffuser wheel 91 are collimated by the collective optical system 8, converted into S-polarized light (polarization rotated light) by the λ/4 plate 7, and is emitted to the polarized light splitting film 612. The red light $R_{LD}S$ and the blue light $B3_{LD}S$, which are converted into S-polarized light, are reflected by the polarized light splitting film 612 and guided to the illumination optical system IS.

Figure 19:
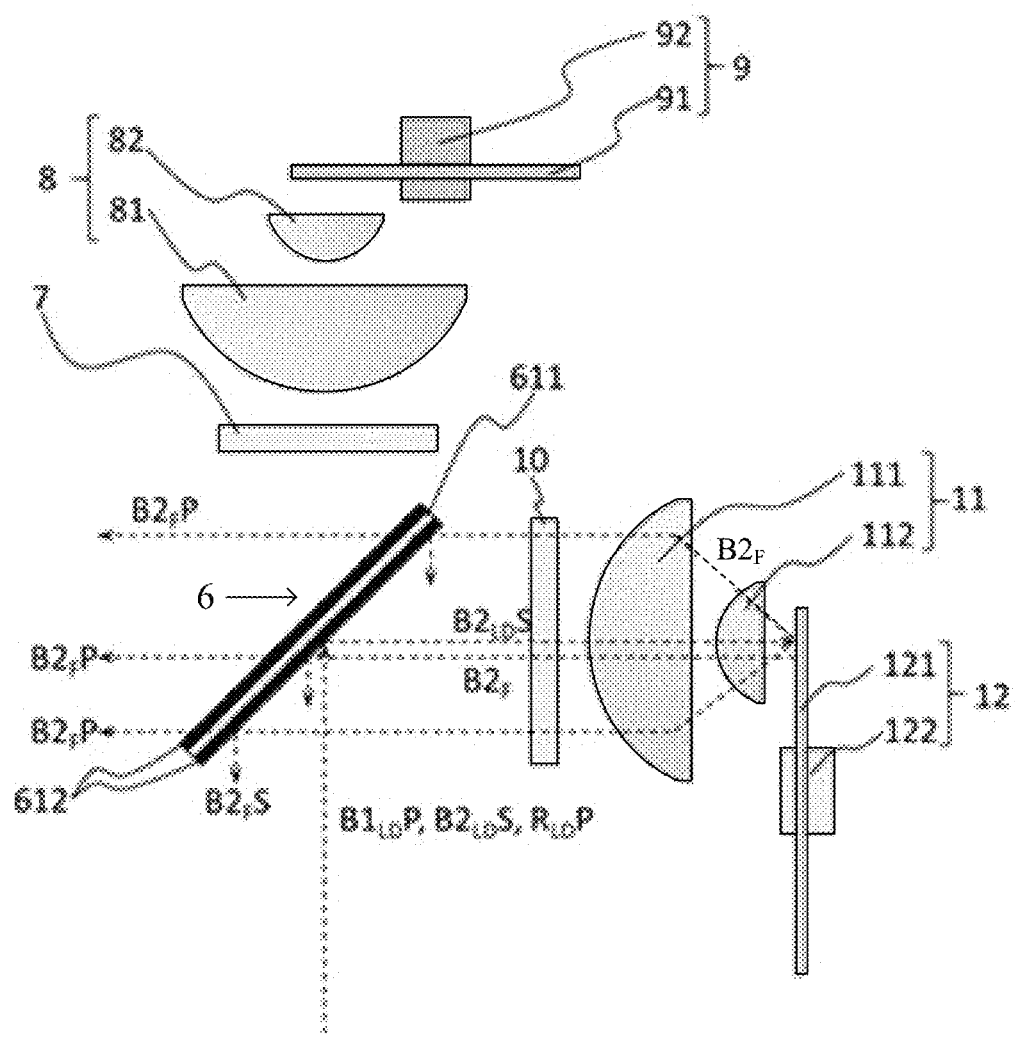
FIG. 19 is a diagram illustrating optical paths of second blue light and red light in the light source apparatus according to the fourth embodiment.

FIG. 19 illustrates an optical path when the blue light $B2_{LD}$ from the blue LD array 2B is guided to the illumination optical system IS via the fluorescent body unit 12. As described with reference to FIG. 18, the blue light $B2_{LD}S$, which is S-polarized light, is reflected by the polarized light splitting film 612. The reflected blue light $B2_{LD}S$ is converted into circularly polarized light by the λ/4 plate 10, collected by the collective optical system 11, and emitted to a yellow fluorescent body layer on the fluorescent body wheel 121. The yellow fluorescent body layer performs wavelength conversion so as to convert part of the blue light as excitation light into yellow light (red light+green light) as fluorescent light having wavelength longer than the wavelength of the blue light.

Non-converted blue light $B2_F$ as non-converted light of the blue light $B2_{LD}S$, which has not been wavelength-converted by the yellow fluorescent body layer, is collimated by the collective optical system 11, passes through the λ/4 plate 10, and enters the polarized light splitting film 612. Polarization directions of the non-converted blue light $B2_F$ entering the polarized light splitting film 612 are not aligned, and an S-polarized light component $B2_FS$ of the non-converted blue light $B2_F$ is reflected by the polarized light splitting film 612 and returned to the blue LD array 2B. A P-polarized light component $B2_FP$ passes through the polarized light splitting film 612 and is guided to the illumination optical system IS.

Figure 20:
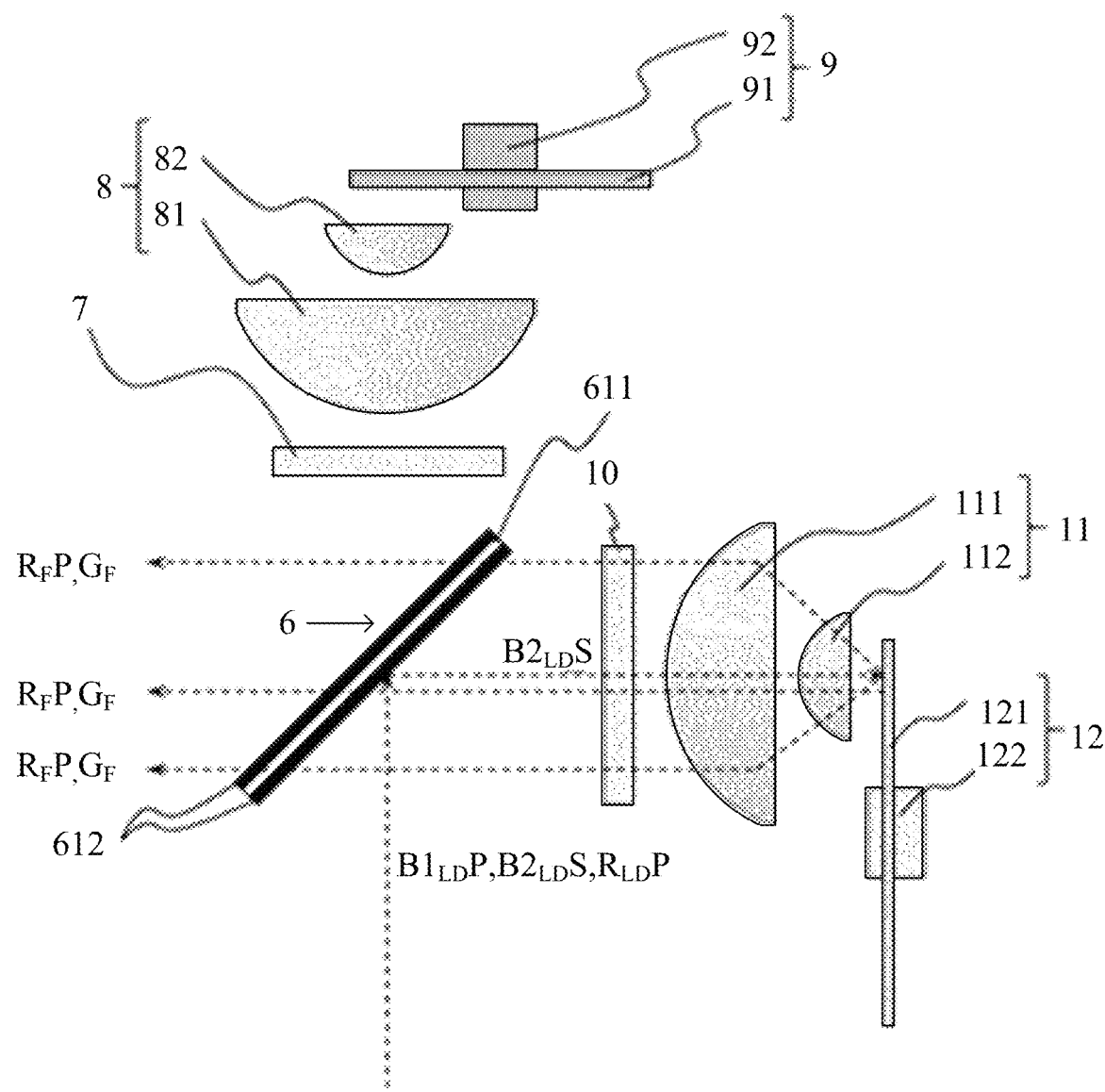
FIG. 20 is a diagram illustrating an optical path of fluorescent light in the light source apparatus according to the fourth embodiment.

FIG. 20 illustrates an optical path when fluorescent light ($R_F$, $G_F$) from the fluorescent body unit 12 is guided to the illumination optical system IS. As described above, green fluorescent light $G_F$ and red fluorescent light $R_F$ are emitted from the yellow fluorescent body layer on the fluorescent body wheel 121. The fluorescent light ($R_F$, $G_F$) entering the polarized light splitting film 612 having the above-described characteristic is guided to the illumination optical system IS through the polarized light splitting film 612 regardless of a polarization direction of the fluorescent light.

As described above, the light source apparatus 100C illustrated in FIG. 17 combines yellow light Y, which includes red light R and green light G, and blue light B with the polarized light splitter 6 and emits the light to the illumination optical system IS as emitted light.

This embodiment also has a problem of a luminance saturation of a fluorescent body included in a yellow fluorescent body layer. In xy chromaticity, light from the blue LD array 2B has a chromaticity of (0.14, 0.04), and light from the blue LD array 3B has a chromaticity of (0.13, 0.06). The fluorescent light has a chromaticity of (0.41, 0.57), and light from the red LD array 1R has a chromaticity of (0.72, 0.28).

As described in the first embodiment, as an excitation light amount from the blue LD array 2B increases, a fluorescent light amount also increases, but light that returns as the excitation light without being converted into fluorescent light gradually increases. As a result, the fluorescent light amount emitted from the fluorescent body decreases, indicating a tendency of saturation.

On the other hand, when the light amount from the blue LD array 3B is maintained, blue light amount emitted from the light source apparatus is maintained. As the excitation light amount from the blue LD array 2B increases, the fluorescent light amount increases, and thus a chromaticity of the light emitted from the light source apparatus 100C changes from the chromaticity of the fluorescent light so as to approach the chromaticity of the excitation light via a line connecting the chromaticity of the excitation light and the chromaticity of the fluorescent light. In this embodiment, ● in FIG. 8 indicates changes in the chromaticity (y value) of the light emitted from the light source apparatus 100C with respect to changes in the excitation light amount ($B2_{LD}$) from the blue LD array 2B. As indicated in the figure, when the excitation light amount is almost halved, the y value, which is the chromaticity of the light emitted from the light source apparatus 100C, decreases from 0.38 to 0.29 because the fluorescent light amount decreases.

Next, an example will be given of a case where the light amount from the blue LD array 3B decreases. If the light amount from the other blue LD array 2B is maintained, the fluorescent light amount from the fluorescent body is maintained. Thus, when the light amount from the blue LD array 3B decreases, the chromaticity of the light emitted from the light source apparatus 100C changes so as to approach the chromaticity of the fluorescent light via a line connecting the chromaticity of the excitation light and the chromaticity of the fluorescent light. In this embodiment, ■ in FIG. 8 indicates changes in the chromaticity (y value) of the light emitted from the light source apparatus 100C with respect to changes in the excitation light amount ($B3_{LD}$) from the blue LD array 3B. As indicated in the figure, when the excitation light amount is almost halved, a ratio of the blue light amount to the fluorescent light amount decreases, and the fluorescent light becomes relatively strong. Therefore, the y value, which is the chromaticity of the light emitted from the light source apparatus 100C, increases from 0.38 to 0.46.

As described above, when the light amount from at least one of the blue LD array 2B and the blue LD array 3B changes, the chromaticity of the light emitted from the light source apparatus 100C changes. In order to hinder such a phenomenon from occurring, the controller 20 records the change in the chromaticity of the light emitted from the light source apparatus 100C while changing the light amount from the blue LD array 2B and the blue LD array 3B. For example, when the light amount from the blue LD array 2B is changed to 1, 0.75, and 0.5, they values of 0.38, 0.34, and 0.29 are recorded, and the relation thereof is recorded as a lookup table stored in a memory in the projector P. Similarly, when the light amount from the blue LD array 3B is changed to 1, 0.75, and 0.5, the y values of 0.30, 0.41, and 0.46 are recorded, and the relation thereof is recorded as a lookup table stored in the above memory.

As the operating time of the projector P increases, the blue LD array 2B and the blue LD array 3B deteriorate, and the respective light amounts emitted from them decrease. As a result, the chromaticity of the light emitted from the light source apparatus 100C changes due to the above-described characteristic. Thus, in this embodiment, the controller 20 acquires the deterioration amounts of the blue LD array 2B and the blue LD array 3B as described in the flowchart of FIG. 27 (step S101), and thereafter, provides a control on driving of the blue LD arrays 2B and 3B based on the respective change amounts of the light emission amounts of the blue LD arrays 2B and 3B (step S102). The method of acquiring the deterioration amount is as described in the first embodiment.

For example, when the light amount from the blue LD array 2B is reduced by 25%, it is assumed from the lookup table that the y value of the light emitted from the light source apparatus 100C is reduced by 0.04. On the other hand, in order to reduce the y value of the light emitted from the light source apparatus 100C by 0.04, it is calculated by using the above-described lookup table that the light amount from the blue LD array 3B has to be reduced by 29%. Hence, the controller 20 increases driving current of the blue LD array 3B so as to reduce the light amount from the blue LD array 3B by 29% from an initial light amount of the projector P.

On the other hand, in a case where the red LD array 1R is provided as in this embodiment, when adjustment is performed for maintaining the chromaticity of all white, it is necessary not only to adjust the light modulator, but to maintain the chromaticity of the single red color so that the color gamut is maintained, as described in the third embodiment. Therefore, also in this embodiment, the controller 20 adjusts the red light amount from the red LD array 1R so that the mixing ratios of the red fluorescent light and the red light from the red LD array 1R are equal as in the third embodiment.

As described above, when the light amount from at least one of the red LD array 1R and the blue LD array 2B changes, the chromaticity of the light emitted from the light source apparatus 100C changes. In order to hinder such a phenomenon from occurring, the controller 20 records the change in the chromaticity of the light emitted from the light source apparatus 100C while changing the light amount from the red LD array 1R and the blue LD array 2B. Thereafter, the change in the red light amount emitted from the light source apparatus 100C corresponding to the change in the chromaticity is calculated, and the red light amount from the red LD array 1R that almost matches the change in the calculated red light amount is recorded as a lookup table stored in the memory.

For example, when the light amount from the red LD array 1R is changed to 1, 0.75, and 0.5, the x values of 0.314, 0.328, and 0.343 are recorded, and the relation thereof is recorded as a lookup table stored in the memory in the projector P. Similarly, when the light amount from the blue LD array 2B is changed to 1, 0.75, and 0.5, they values of 0.378, 0.403, and 0.423 are recorded, and the relation thereof is recorded as a lookup table stored in the above memory.

As the operating time of the projector P increases, the red LD array 1R and the blue LD array 2B deteriorate, and the respective light amounts emitted from them decrease. As a result, the chromaticity of the light emitted from the light source apparatus 100C changes due to the above-described characteristic. Thus, in this embodiment, the controller 20 acquires the deterioration amounts of the red LD array 1R and the blue LD array 2B as described in the flowchart of FIG. 27 (step S101), and thereafter, provides a control on driving of the red and blue LD arrays 1R and 2B based on the respective change amounts of the light emission amounts of the red and blue LD arrays 1R and 2B (step S102). The method of acquiring the deterioration amount is as described in the first embodiment.

For example, when the light amount from the blue LD array 2B is reduced by 50%, it is assumed from the lookup table that the y value of the light emitted from the light source apparatus 100C is reduced by 0.025. On the other hand, when the y value of the light emitted from the light source apparatus 100C is reduced by 0.025, the fluorescent light amount decreases by 45%. Thus, it is calculated by using the lookup table that the red light amount from the red LD array 1R has to be reduced by the same amount. Hence, the controller 20 reduces driving current of the red LD array 1R so as to reduce the red light amount from the red LD array 1R by 45% from an initial light amount of the projector P. Thereby, it is possible to hinder the color change of the light emitted from the light source apparatus 100C.

It is also possible for a user of the projector P to set luminance of the light source. Specifically, the controller 20 acquires a luminance set value of the light source set by the user by a setting operation on the projector P, and changes the light amount from at least one of the blue LD arrays 2B and 3B based on the luminance set value (steps S101' and 102 in FIG. 27).

Here, a description will be given of a case where the user sets the luminance of the light source to 60%. When the illumination of the light source is set to 60% by the user, the light amount from the blue LD array 2B is reduced so that the light amount emitted from the light source apparatus 100C is 60% of the maximum output. However, due to the above-described fluorescence saturation characteristic of the fluorescent body, when the light amount from the blue LD array 2B is set to 60%, the fluorescent light amount has a value larger than 60%. In this embodiment, the controller 20 sets the light amount from the blue LD array 2B to 50%, so that the fluorescent light amount from the fluorescent body is set to 60%. When the light amount from the blue LD array 2B is set to 50%, it is assumed by using the lookup table that the y value of the light emitted from the light source apparatus 100C is 0.34, which is smaller by 0.04 than the y value when the luminance of the light source is 100%.

On the other hand, when the y value of the light emitted from the light source apparatus 100C decreases by 0.04, it is calculated by using the above-described lookup table that the fluorescent light amount decreases by 40%, and the red light amount from the red LD array 1R has to be reduced by the same amount. Thus, the controller 20 increases driving current of the red LD array 1R so as to reduce the red light amount from the red LD array 1R by 40%. As a result, the luminance of the light source set by the user can be provided, and the color change in the light emitted from the light source apparatus 100C can be hindered.

As described above, the controller 20 in this embodiment controls, based on a change in the light emission amount from at least one of the red and blue LD arrays 1R, 2B, and 3B, the light emission amount from at least one of the red and blue LD arrays 1R, 2B, and 3B, so that the change amounts in the light emission amounts from the red and blue LD arrays 1R, 2B, and 3B, are different from each other, or so that a ratio between the light emission amounts from the red and blue LD arrays 1R, 2B, and 3B changes. Thereby, even if the light emission amount from at least one of the red and blue LD arrays 1R, 2B, and 3B changes, it is possible to reduce a change in the color of the light emitted from the light source apparatus 100C.

In the first to fourth embodiments, the configuration using the $\lambda/4$ plate 10 is described, but the $\lambda/4$ plate 10 may not be used.

Fifth Embodiment

Figure 21:
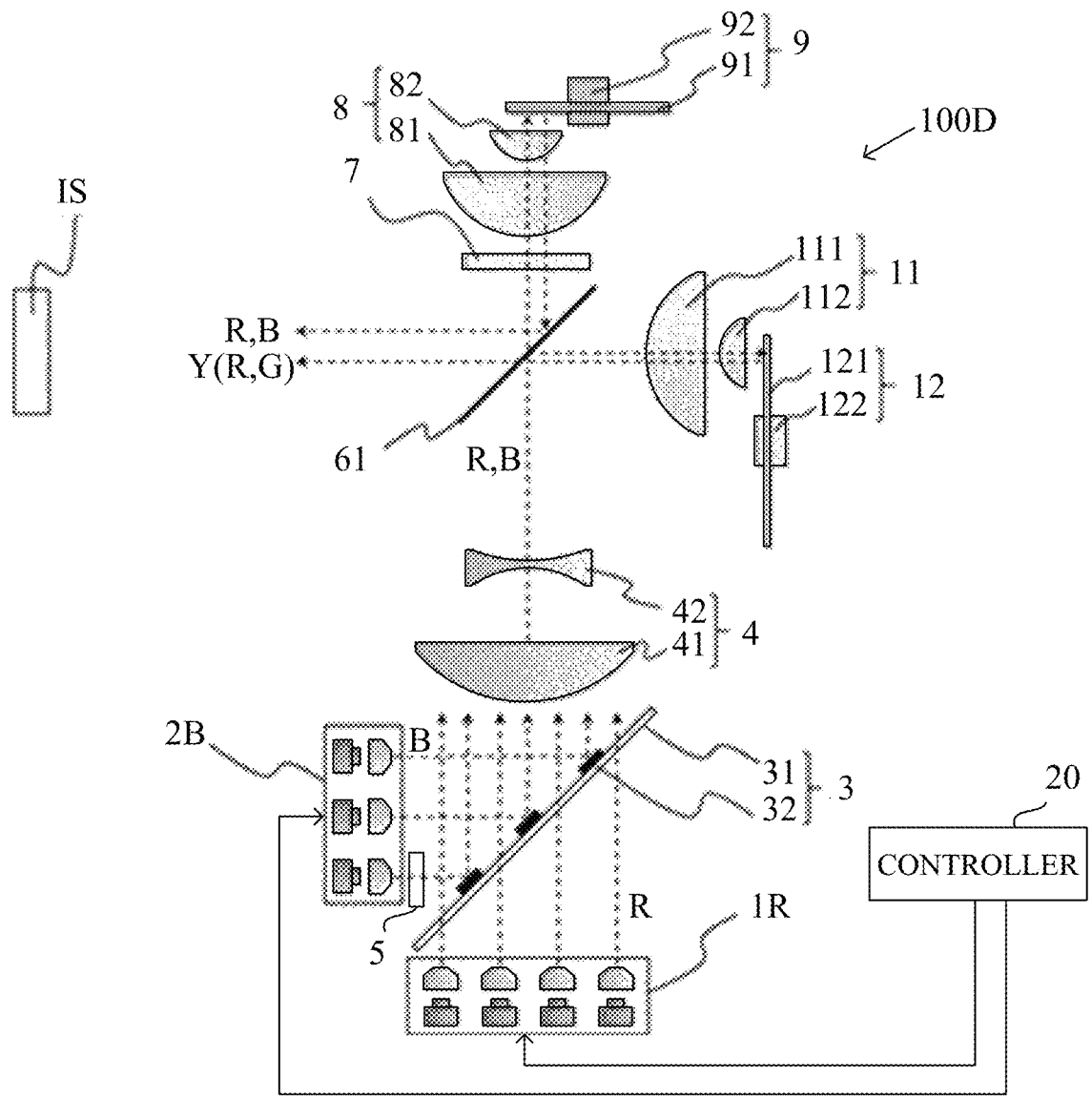
FIG. 21 is a diagram illustrating a configuration of a light source apparatus according to the fifth embodiment.

FIG. 21 illustrates a configuration of a light source apparatus 100D according to the fifth embodiment. The light source apparatus 100D in this embodiment includes a polarized light splitter 61 having a configuration different from the configuration of the polarized light splitter 6 provided in the light source apparatus 100B in the third embodiment, and does not include a $\lambda/4$ plate 10 provided in the light source apparatus 100B in the third embodiment. Further, the light source apparatus 100D in this embodiment includes a $\lambda/2$ plate 5 which is not provided in the light source apparatus 100B in the third embodiment.

The light source apparatus 100D also includes a controller 20, and the controller 20 executes processing for controlling driving of a red LD array 1R and a blue LD array 2B (that is, a light emission amount) according to a computer program.

Figure 22A:
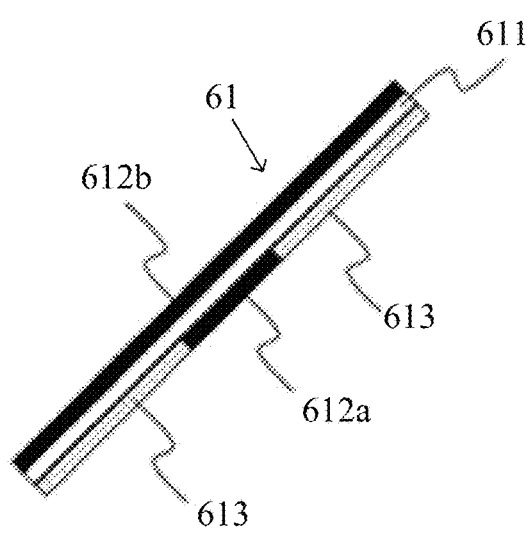
FIGS. 22A to 22C are diagrams illustrating a configuration of a polarized light splitter according to the fifth embodiment.
Figure 22B:
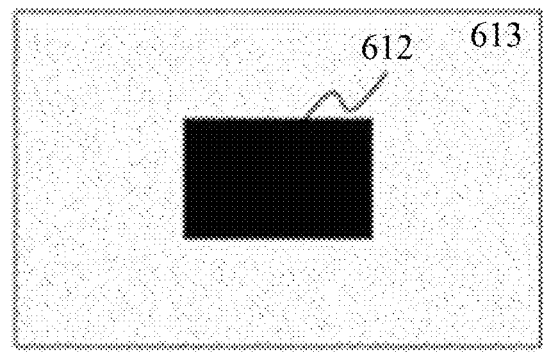
Figure 22C:
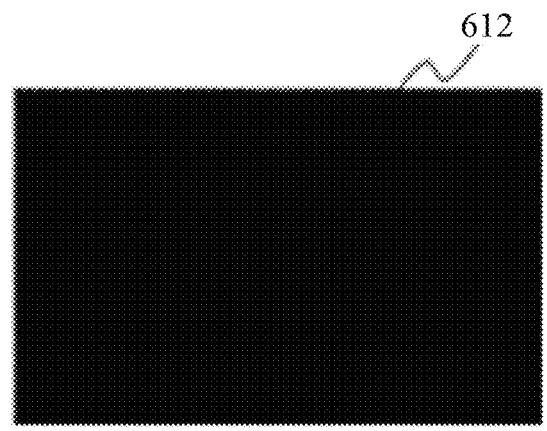

FIGS. 22A to 22C illustrate a configuration of the polarized light splitter 61. As illustrated in FIG. 22A, the polarized light splitter 61 includes a transparent substrate (transmissive substrate) 611, a polarized light splitting film (hereinafter referred to as an entrance side polarized light splitting film) 612a provided on a surface on an entrance side of the transparent substrate 611, a phase difference generator 613, and a polarized light splitting film (hereinafter referred to as an emitting side polarized light splitting film) 612b provided on a surface on an emitting side of the transparent substrate 611. As described in the third embodiment, the polarized light splitting films 612a and 612b have characteristics of performing polarization splitting for blue light from the blue LD array 2B and red light from the red LD array 1R, and transmitting light having other wavelengths regardless of its polarization direction.

In the polarized light splitter 6 described in the third embodiment, the polarized light splitting film 612 is provided on the entire surface on the entrance side of the transparent substrate 611. On the other hand, in the polarized light splitter 61 in this embodiment, as illustrated in FIGS. 22A and 22B, the entrance side polarized light splitting film 612a is provided on part of the surface on the entrance side of the transparent substrate 611, and the phase difference generator 613 is provided on an area (around the entrance side polarized light splitting film 612a) different from the area on which the entrance side polarized light splitting film 612a is provided. The phase difference generator 613 has a characteristic of converting S-polarized light entering the phase difference generator 613 into P-polarized light and converting P-polarized light entering the phase difference generator 613 into S-polarized light (that is, rotating a polarization direction by 90 degrees). The emitting side polarized light splitting film 612b is provided on an entire surface on the emitting side of the transparent substrate 611.

The entrance side polarized light splitting film 612a is disposed so that most of light from the compression optical system 4 enters. When the polarized light splitter 61 is viewed from an optical axis direction of the compression optical system 4, the area of the entrance side polarized light splitting film 612a is larger than an area where the light from the compression optical system 4 enters the surface on the entrance side of the polarized light splitter 61.

Figure 23:
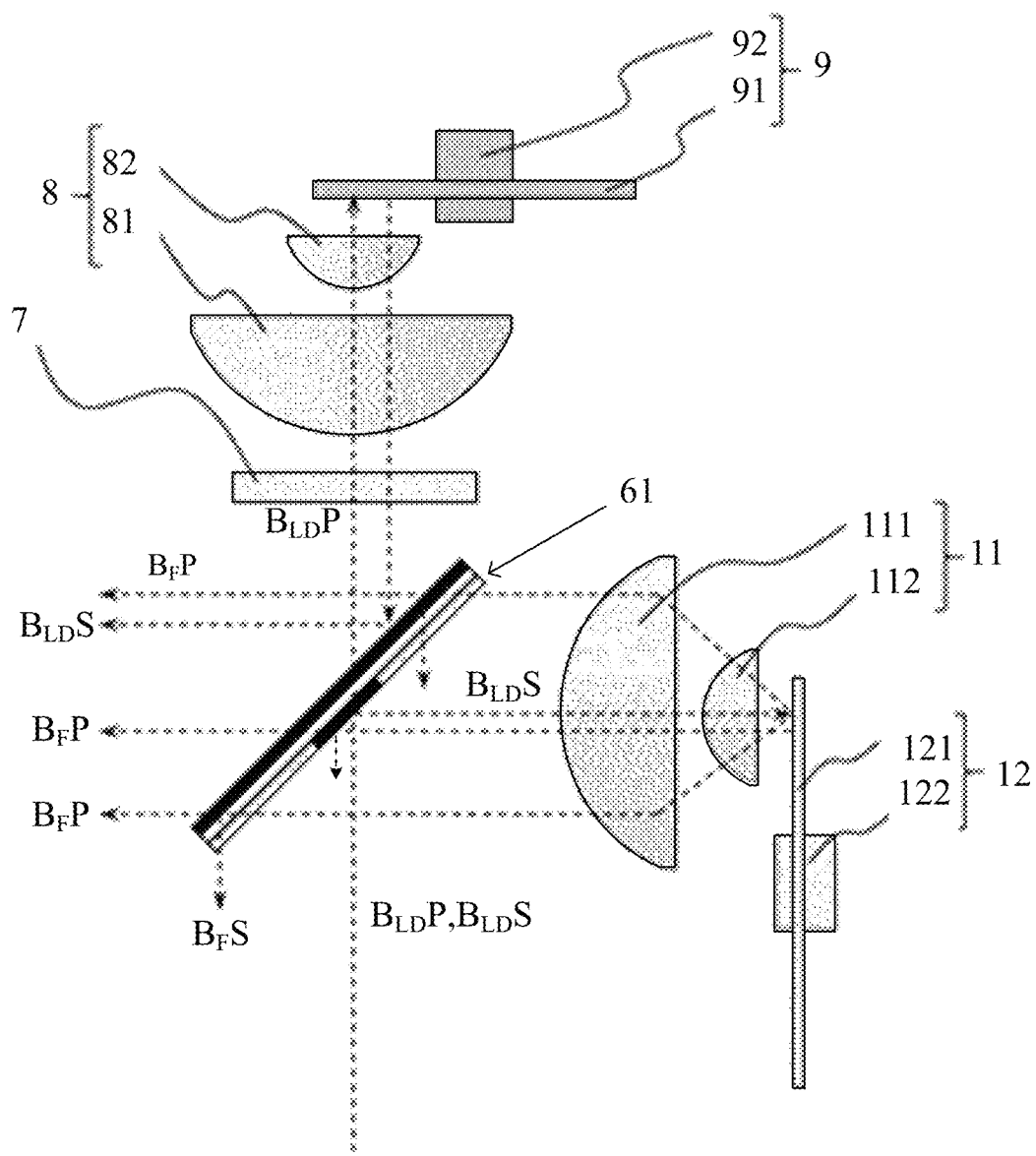
FIG. 23 is a diagram illustrating an optical path of blue light in the light source apparatus according to the fifth embodiment.

FIG. 23 illustrates an optical path when blue light $B_{LD}$ from the blue LD array 2B is guided to the illumination optical system IS via a diffuser unit 9 and a fluorescent body unit 12. Part of blue light $B_{LD}S$, which is S-polarized light, from the blue LD array 2B enters the λ/2 plate 5 and converted into blue light $B_{LD}P$, which is P-polarized light. The blue light $B_{LD}P$, which is P-polarized light, is transmitted through the entrance side and emitting side polarized light splitting films 612a and 612b, converted into circularly polarized light by a λ/4 plate 7, collected by a collective optical system 8, and emitted to a diffuser wheel 91 on the diffuser unit 9. The blue light $B_{LD}$ diffused by the diffuser wheel 91 is collimated by the collective optical system 8, converted into S-polarized light (polarization rotated light) $B_{LD}S$ by the λ/4 plate 7, reflected by the emitting side polarized light splitting film 612b, and guided to an illumination optical system IS.

Blue light $B_{LD}S$, which is S-polarized light and has not been converted into P-polarized light by the λ/2 plate 5, is reflected by the entrance side polarized light splitting film 612a on the polarized light splitter 61, guided to the fluorescent body unit 12, and emitted to the yellow fluorescent body layer on the fluorescent body wheel 121. Part of the blue light $B_{LD}S$ entering the yellow fluorescent body layer is wavelength-converted into fluorescent light.

Non-converted blue light $B_F$, which has not been wavelength-converted by the yellow fluorescent body layer, is collimated by the collective optical system 11, and enters the polarized light splitter 61. Polarization directions of the non-converted blue light $B_F$ entering the polarized light splitter 61 are not aligned. Part of an S-polarized light component $B_FS$ of the non-converted blue light $B_F$ is reflected by the entrance side polarized light splitting film 612a and returned to the blue LD array 2B. The S-polarized light component $B_FS$ entering the phase difference generator 613 is converted into blue light $B_FP$, which is P-polarized light, transmitted through the emitting side polarized light splitting film 612b, and is guided to the illumination optical system IS.

Figure 24:
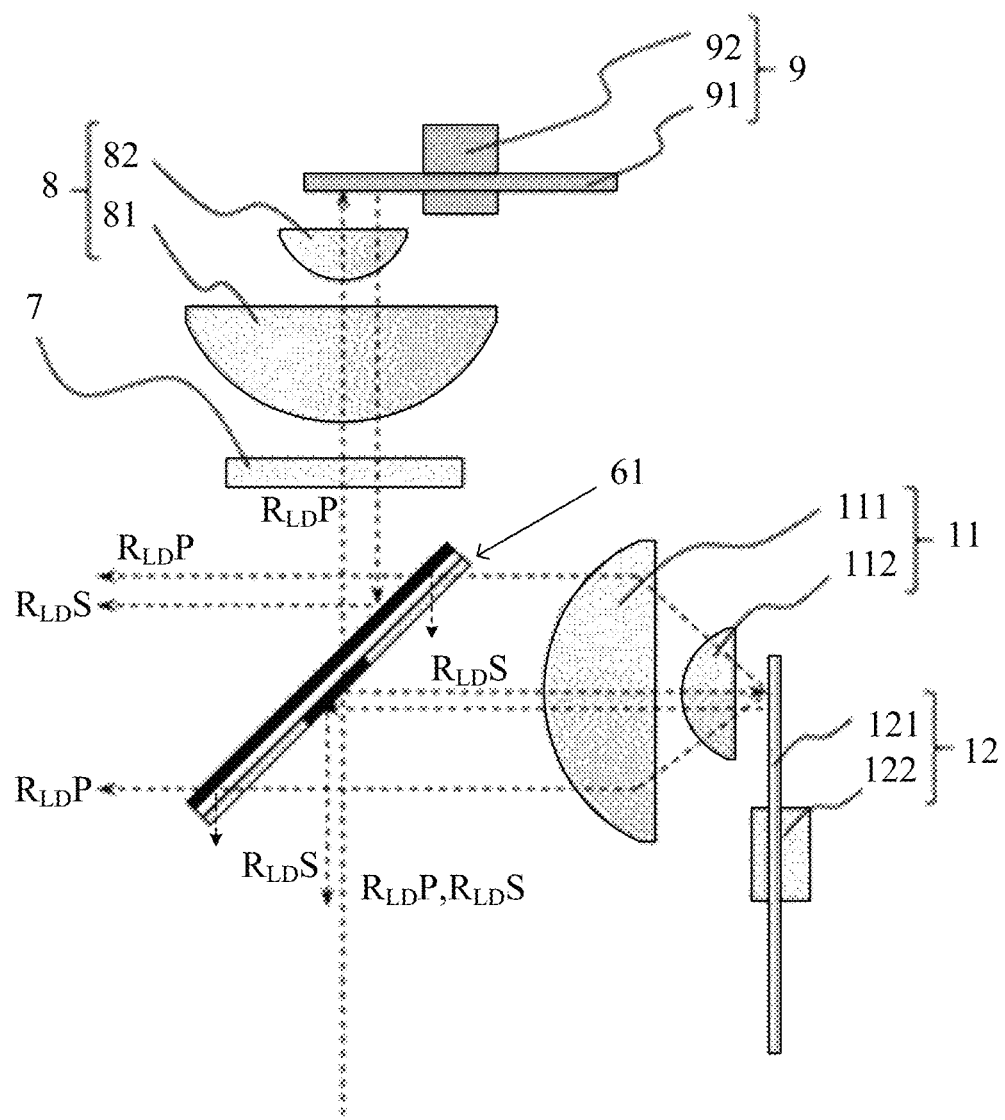
FIG. 24 is a diagram illustrating an optical path of red light in the light source apparatus according to the fifth embodiment.

FIG. 24 illustrates an optical path when red light $R_{LD}$ from the red LD array 1R is guided to the illumination optical system IS via the diffuser unit 9 and the fluorescent body unit 12. Part of red light $R_{LD}S$, which is S-polarized light, from the red LD array 1R enters the λ/2 plate 5 and converted into red light $R_{LD}P$, which is P-polarized light. The red light $R_{LD}P$, which is P-polarized light, passes through the entrance side and emitting side polarized light splitting films 612a and 612b on the polarized light splitter 61, and is converted into circularly polarized light by the λ/4 plate 7, collected by the collective optical system 8, and emitted to the diffuser wheel 91 on the diffuser unit 9. The red light $R_{LD}$ diffused by the diffuser wheel 91 is collimated by the collective optical system 8, converted into S-polarized light (polarization rotated light) $R_{LD}S$ by the λ/4 plate 7, reflected by the emitting side polarized light splitting film 612b, and guided to the illumination optical system IS.

Red light $R_{LD}S$, which is S-polarized light and has not been wavelength-converted into P-polarized light by the λ/2 plate 5, is reflected by the entrance side polarized light splitting film 612a, guided to the fluorescent body unit 12, and enters the yellow fluorescent body layer on the fluorescent body wheel 121. The red light $R_{LD}S$ is not converted into fluorescent light by the yellow fluorescent body layer, its polarization direction is made to be disarranged, and the red light $R_{LD}S$ returns to the polarized light splitter 61 via the collective optical system 11.

Part of the S-polarized light component $R_{LD}S$ of the red light $R_{LD}$ returned from the fluorescent body unit 12 to the polarized light splitter 61 is reflected by the entrance side polarized light splitting film 612a and returned to the red LD array 1R. The S-polarized light component $R_{LD}S$ entering the phase difference generator 613 is converted into red light $R_{LD}P$, which is P-polarized light, transmitted through the emitting side polarized light splitting film 612b, and guided to the illumination optical system IS.

Figure 25:
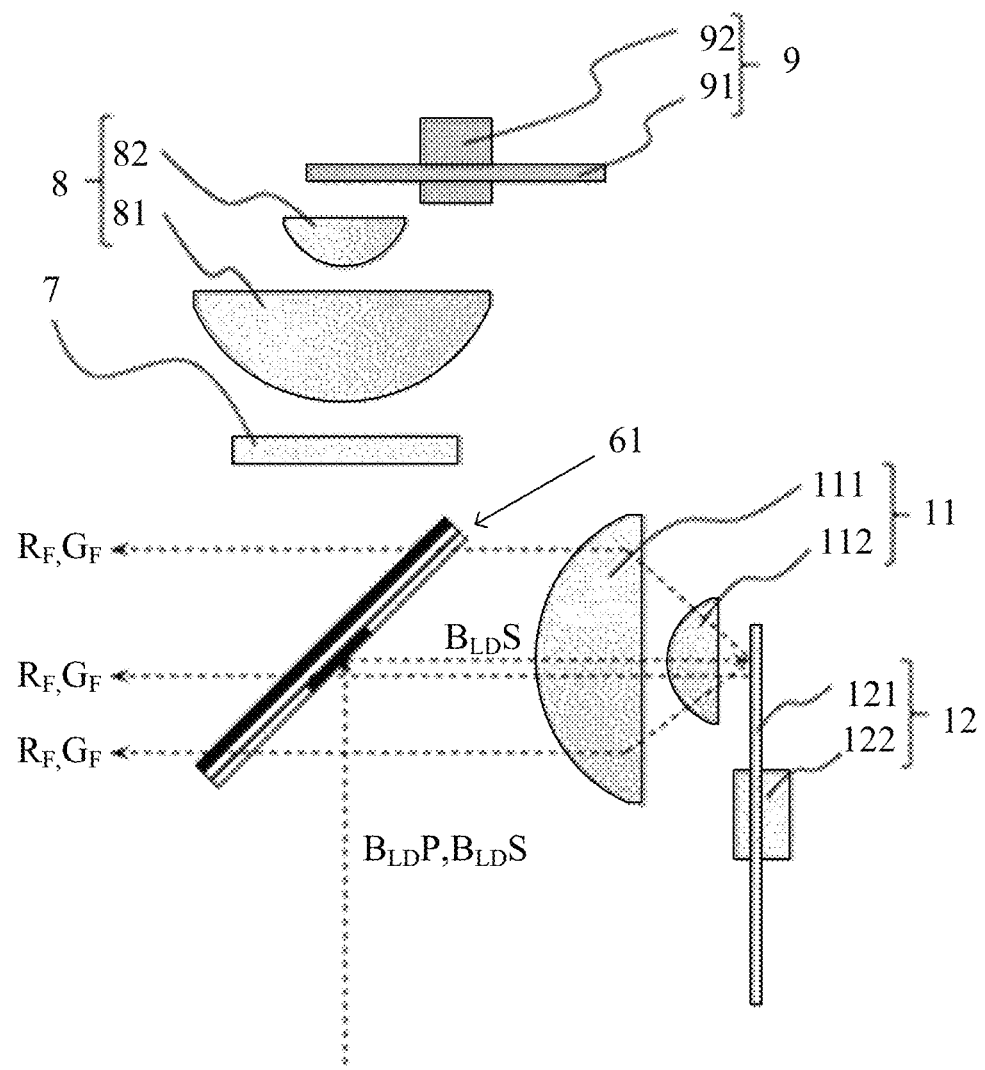
FIG. 25 is a diagram illustrating an optical path of fluorescent light in the light source apparatus according to the fifth embodiment.

FIG. 25 illustrates an optical path when fluorescent light $R_F$ and $G_F$ from the fluorescent body unit 12 is guided to the illumination optical system IS. Of the fluorescent light $R_F$ and $G_F$ entering the entrance side polarized light splitting film 612a, part of the red fluorescent light $R_F$, which has a wavelength different from the red light $R_{LD}$ from the red light LD array 1R, is transmitted through the entrance side and emitting side polarized light splitting films 612a and 612b on the polarized light splitter 61, and is guided to the illumination optical system IS. A P-polarized light component of the red fluorescent light $R_F$ entering the phase difference generator 613 is converted into S-polarized light $R_FS$ by the phase difference generator 613, reflected by the emitting side polarized light splitting film 612b, and is returned to the side closer to the red LD array 1R. On the other hand, an S-polarized light component of the red fluorescent light $R_F$ entering the phase difference generator 613 is converted into P-polarized light $R_FP$ by the phase difference generator 613, transmitted through the emitting side polarized light splitting film 612b, and guided to the illumination optical system IS.

As described above, the light source apparatus 100D illustrated in FIG. 21 combines yellow light Y, which includes red light R and green light G, and blue light B with the polarized light splitter 6 and emits the light to the illumination optical system IS as emitted light.

In this embodiment, it is not necessary to use the λ/4 plate 10 used in the third embodiment. In this embodiment, as in the third embodiment, it is possible to display a projected image brighter than conventional projected images.

In each of this embodiment and the third and fourth embodiments, a description has been given of a configuration in which red light from the red LD array 1R is transmitted through the light combiner 3 and blue light from the blue LD array 2B is reflected by the light combiner 3. However, red light from the red light LD array 1R may be reflected by the light combiner 3, and blue light from the blue LD array 2B may be transmitted through the light combiner 3. That is, one of the first polarized light and the second polarized light is transmitted and the other is reflected. The same applies to the first and second embodiments.

In each of this embodiment and the third and fourth embodiments, a description has been given of a configuration in which the light combiner 3 is provided with the aluminum reflective film as the reflective portion. However, as the reflective portion, a dichroic film configured to reflect blue light from the blue LD array 2B and to transmit red light from the red LD array 1R may be used. The same applies to the first and second embodiments. In each of the first to fifth embodiments, a reflective mirror may be used as the reflective portion of the light combiner 3.

Figure 26:
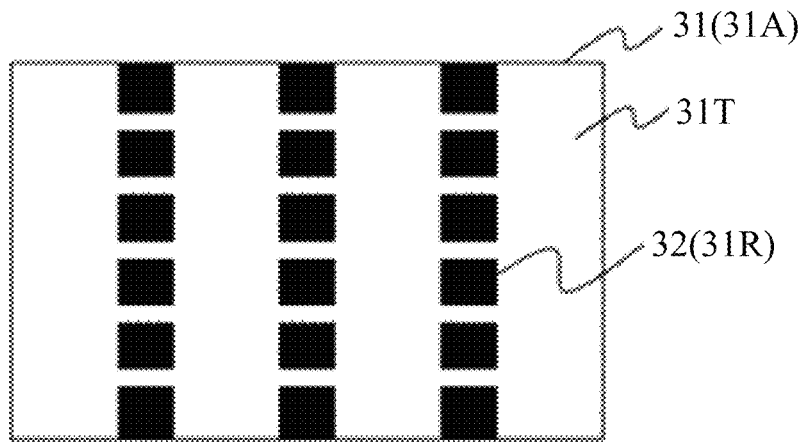
FIG. 26 is a diagram illustrating a configuration of a polarized light splitter according to the first to fifth embodiments.

Further, in each of the first to fifth embodiments, the light combiner 3 may have a configuration illustrated in FIG. 26. In FIG. 26, instead of the strip-shaped reflective portions as illustrated in FIG. 3A, a finer plurality of reflective portions are arranged in an array.

In each of the first to fifth embodiments, a description has been given of a case where light transmitted through the polarized light splitter 6 or 61 is guided to the diffuser unit 9 and light reflected by the polarized light splitter 6 or 61 is guided to the fluorescent body unit 12. However, the light reflected by the polarized light splitter may be guided to the diffuser unit, and the light transmitted through the polarized light splitter may be guided to the fluorescent body unit. That is, in the polarized light splitter, one of first and second polarized light is transmitted and the other is reflected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light source apparatus comprising:
a first light source configured to emit first polarized light;
a second light source configured to emit second polarized light whose polarization direction is different from a polarization direction of the first polarized light;
an optical element configured to transmit one polarized light of the first and second polarized light and to reflect the other polarized light;
a polarization rotator configured to generate polarization rotated light by rotating the polarization direction of the first polarized light from the optical element;
a wavelength convertor configured to convert the second polarized light from the optical element into wavelength converted light whose wavelength is different from a wavelength of the second polarized light; and
a controller,
wherein the optical element generates emitted light by combining the wavelength converted light and the polarization rotated light,
wherein the first polarized light is red light, and the second polarized light is blue light, and
wherein the controller is configured to:
control, based on respective changes in light emission amounts from the first and second light sources, the light emission amount from at least one light source of the first and second light sources so as to make different a correction amount of the light emission amount from the first light source and a correction amount of the light emission amount from the second light source, or so as to change a ratio between the light emission amount from the first light source and the light emission amount from the second light source.

2. The light source apparatus according to claim 1, wherein the controller is configured to:
acquire a user set value relating to luminance of the emitted light; and
control the light emission amount from the at least one light source based on a change amount of the light emission amount corresponding to the user set value.

3. The light source apparatus according to claim 1, wherein the optical element includes:
a transmissive substrate; and
a polarized light splitting film provided on at least one surface of the transmissive substrate and configured to transmit the one polarized light and to reflect the other polarized light.

4. The light source apparatus according to claim 3, wherein the polarized light splitting film is provided on part of the one surface of the transmissive substrate so that the polarized light splitting film has an area larger than an area where the first and second polarized light from the first and second light sources enter the optical element.

5. The light source apparatus according to claim 1, comprising a light combining element configured to combine the first polarized light and the second polarized light and to guide them to the optical element,
wherein the light combining element includes:
a transmissive area configured to transmit one of the first and second polarized light; and
a reflective area configured to reflect the other of the first and second polarized light.

6. The light source apparatus according to claim 5, wherein one area of the transmissive area and the reflective area is larger than the other area, wherein the second polarized light entering the one area.

7. The light source apparatus according to claim 5, wherein an antireflection film is provided on a surface of the optical element on a side closer to the first light source.

8. The light source apparatus according to claim 1, comprising a diffuser configured to diffuse the first polarized light from the optical element and to return it to the optical element,
wherein the polarization rotator is a first $\lambda/4$ plate provided between the optical element and the diffuser.

9. The light source apparatus according to claim 1, wherein a second $\lambda/4$ plate is provided between the optical element and the wavelength convertor.

10. The light source apparatus according to claim 1, wherein the optical element includes a phase difference generator configured to rotate a polarization direction of entering light from the wavelength convertor.

11. The light source apparatus according to claim 1, comprising a third light source configured to emit third polarized light having a wavelength different from respective wavelengths of the first and second polarized light, the third light source being provided as another first light source different from the first light source.

12. An image projection apparatus comprising:
the light source apparatus according to claim 1; and
a light modulator configured to modulate light emitted from the light source apparatus,
wherein an image is displayed by projecting light modulated by the light modulator.

13. A control method for a light source apparatus including a first light source configured to emit first polarized light, a second light source configured to emit second polarized light whose polarization direction is different from a polarization direction of the first polarized light, an optical element configured to transmit one polarized light of the first and second polarized light and to reflect the other polarized light, a polarization rotator configured to generate polarization rotated light by rotating the polarization direction of the first polarized light from the optical element, a wavelength convertor configured to convert the second polarized light from the optical element into wavelength converted light whose wavelength is different from a wavelength of the second polarized light, and a controller, wherein the optical element generates emitted light by combining the wavelength converted light and the polarization rotated light, and wherein the first polarized light is red light, and the second polarized light is blue light, the control method comprising:

acquiring respective changes in light emission amounts from the first and second light sources; and controlling, based on the changes, the light emission amount from at least one light source of the first and second light sources so as to make different a correction amount of the light emission amount from the first light source and a correction amount of the light emission amount from the second light source, or so as to change a ratio between the light emission amount from the first light source and the light emission amount from the second light source.

14. A non-transitory computer-readable storage medium storing a computer program that causes a computer of the light source apparatus including a first light source configured to emit first polarized light, a second light source configured to emit second polarized light whose polarization direction is different from a polarization direction of the first polarized light, an optical element configured to transmit one polarized light of the first and second polarized light and to reflect the other polarized light, a polarization rotator configured to generate polarization rotated light by rotating the polarization direction of the first polarized light from the optical element, a wavelength convertor configured to convert the second polarized light from the optical element into wavelength converted light whose wavelength is different from a wavelength of the second polarized light, and a controller, wherein the optical element generates emitted light by combining the wavelength converted light and the polarization rotated light, and wherein the first polarized light is red light, and the second polarized light is blue light, to execute processing of the controlling method according to claim 13.

15. The light source apparatus according to claim 1, wherein the controller acquires lightning time of each of the first and second light sources, and controls a light emission amount of the at least one light source of the first and second light sources in accordance with the change amount of the light emission amount acquired from the lightning time.

* * * * *